United States Patent
Bishop et al.

(10) Patent No.: US 6,611,201 B1
(45) Date of Patent: Aug. 26, 2003

(54) METHOD AND APPARATUS FOR ACCESSING, MONITORING AND CONTROLLED SPECIFIED FUNCTIONS, FEATURES AND ACCESSORIES OF A VEHICLE

(75) Inventors: Ronald D. Bishop, Trabuco Canyon, CA (US); Kenneth M. Dodd, Bloomfield Hills, MI (US); R. Clark Lindberg, San Diego, CA (US)

(73) Assignee: Ventronix Corporation, Santa Barbara, CA (US)

( * ) Notice: Subject to any disclaimer, the term of this patent is extended or adjusted under 35 U.S.C. 154(b) by 0 days.

(21) Appl. No.: 09/358,357

(22) Filed: Jul. 21, 1999

Related U.S. Application Data

(63) Continuation-in-part of application No. 09/212,811, filed on Dec. 16, 1998.
(60) Provisional application No. 60/093,623, filed on Jul. 21, 1998, provisional application No. 60/093,735, filed on Jul. 21, 1998, provisional application No. 60/093,635, filed on Jul. 21, 1998, and provisional application No. 60/069,726, filed on Dec. 16, 1997.

(51) Int. Cl.$^7$ .............................................. B60R 25/10
(52) U.S. Cl. .................. 340/426; 340/5.5; 340/825.69; 340/825.72
(58) Field of Search .............................. 340/426, 425.5, 340/539, 825.31, 825.69, 825.72, 5.5, 5.72

(56) References Cited

U.S. PATENT DOCUMENTS

| | | | |
|---|---|---|---|
| 5,513,244 A | * | 4/1996 | Joao et al. .................. 340/539 |
| 5,939,975 A | * | 8/1999 | Tsuria et al. ................. 340/426 |
| 5,986,543 A | * | 11/1999 | Johnson ....................... 340/426 |

* cited by examiner

Primary Examiner—Julie Lieu
(74) Attorney, Agent, or Firm—Luce, Forward, Hamilton & Scripps LLP

(57) ABSTRACT

A system installed in an automobile or other vehicle includes a master pager receiver unit or acknowledgment pager receiver/transmitter which receives paging messages sent from a paging transmitter site. The master unit is also in wireless communication with a set of slave units installed in the vehicle which include electronic switches and are programmed to control relays or other in-vehicle devices upon receipt of appropriate commands from the in-vehicle master unit. The slave units may include transceivers which allow the master unit to receive acknowledgment signals indicating that its commands were followed. The paging transmitter in the master unit also allows transmission of an acknowledgment signal to the paging transmitter site. The system provides a method and apparatus for communicating with specific electrical and mechanical components in the vehicle in order to access, monitor, disable and/or enable certain functions, features, and accessories in the vehicle. Audio and/or visual warning devices can also be used to deliver messages to the owner/operator of the vehicle, such as manufacturer recall notices. When the slave unit hears a specific code it opens or closes a switch that is connected to a specific electrical circuit and thus disables and enables functions of the automobile that are associated with that electrical circuit. The main receiver and/or standalone receiver of the system may also contain wiring harnesses that can be used to wire the main receiver directly to the relays in the automobile. One application of the invention is to remotely activate an audio warning device prior to disabling the ability for the driver to start the automobile by disabling the starter motor.

7 Claims, 9 Drawing Sheets

METHOD AND APPARATUS FOR ACCESSING, MONITORING AND CONTROLLED SPECIFIED FUNCTIONS, FEATURES AND ACCESSORIES OF A VEHICLE

The present application claims the benefit of the following U.S. Provisional Patent Applications: Serial No. 60/093,623, filed Jul. 21, 1998; Serial No. 60/093,735, filed Jul. 21, 1998; and Serial No. 60/093,635, filed Jul. 21, 1998, all of whom are incorporated by reference herein in their entirety.

This application is also a continuation-in-part of copending U.S. patent application Ser. No. 09/212,811, filed Dec. 16, 1998, which, in turn, claims the benefit of U.S. Provisional Patent Application Serial No. 60/069,726, filed Dec. 16, 1997, both of whose contents are incorporated by reference herein in their entirety.

The present invention is directed to a method and apparatus for remotely communicating with specific electrical and mechanical components in a vehicle in order to access, monitor and control certain functions of the vehicle. The present invention also provides a method and apparatus for communicating with specific electrical and mechanical components in order to access, monitor and control certain functions of equipment, system features and equipment accessories.

BACKGROUND OF THE INVENTION

Remote control devices which disable certain functions of automobiles are in the prior art. These devices are integrated into car alarms and carjacking/theft deterrent systems, and allow a person whose car has been stolen to call the stolen automobile using a telephone or, in some cases, a pager in order to inform the theft deterrent system that the automobile has been stolen. The theft deterrent system will then disable the automobile, such as by stopping the motor. In these prior art systems, a hard-wired network of wires connects an antenna to a controller, and the controller to a solenoid or other switch which, when activated or deactivated as the case may be, causes one of the automobile's functions to be disabled. As a typical example, the theft deterrent system of the prior art will cause the automobile's engine to stop running. In these prior art systems, the focus is on stopping the automobile as soon as possible so that a thief will not go far and the automobile will be recovered swiftly.

Other prior art systems use cellular phone technology to transmit a signal to open locked doors, as a service to customers who have locked their keys in the automobile.

SUMMARY OF THE INVENTION

In marked contrast to the prior art, one object of the present invention is to provide a method and apparatus for communicating in a wireless manner with specific components in a vehicle in order to access, monitor, control, disable and/or enable certain functions in the vehicle.

Another object of the present invention is to provide a method and apparatus which permits a loan agency, credit agency, rental agency, law enforcement agency, or any other agency which wishes to have some control and/or monitoring capability over the vehicle, to access, monitor, control, and/or deliver information to/from a vehicle.

Still another object of the present invention is to provide an apparatus which can access, monitor, control, disable, and/or enable functions of a vehicle, and/or deliver information to/from the vehicle, and which is virtually impossible to detect or locate.

These and other objects of the present invention are achieved by an apparatus for providing communication between a vehicle and a remote communication station, said apparatus being mounted in the vehicle and comprising a master control unit for communicating over a first wireless interface with the communication station; and at least one slave unit, said slave unit controlling a function in the vehicle and communicating over a second wireless interface with said master control unit, wherein at least one of said first and second wireless communication interfaces is a two-way wireless communication interface.

Objects of the present invention are also achieved by an apparatus for providing two-way communication between a vehicle and a remote communication station, said apparatus being mounted in the vehicle and comprising a transceiver for receiving an incoming signal from a communication station and transmitting an outgoing signal to the communication station; a first controller, connected to said transceiver, for determining whether said incoming signal includes a predetermined signal and, if so, for instructing a transmission of a command; a wireless transmitter, connected to said first controller, for transmitting the command; and at least one slave unit, said slave unit including a first receiver for receiving said command transmitted by said wireless transmitter, and a second controller, connected to said first receiver, for controlling a function of the vehicle in response to said command.

These and other objects of the present invention are also achieved by an apparatus for providing two-way communication between a vehicle and a remote communication station, said apparatus being mounted in the vehicle and comprising a first receiver for receiving an incoming signal from a communication station; a first controller, connected to said first receiver, for determining whether said incoming signal includes a predetermined signal and, if so, for. instructing a transmission of a command; a first wireless transceiver, connected to said first controller, for transmitting said command and for receiving a message; and at least one slave unit, said slave unit including a second wireless transceiver for receiving said command transmitted by said first wireless transceiver and for transmitting said message, and a second controller, connected to said second wireless transceiver, for controlling a function of the vehicle in response to said command.

The objects of the present invention are also achieved by an apparatus for providing two-way communication between a vehicle and a remote communication station, said apparatus being mounted in the vehicle and comprising a transceiver for receiving an incoming signal from a communication station and transmitting an outgoing signal to the communication station; a first switch for enabling or disabling a function of the vehicle;

a first wireless transmitter; a controller, connected to said transceiver, to said first switch, and to said first wireless transmitter, for determining whether said incoming signal includes a predetermined signal and, if so, for performing at least one of: controlling said switch in order to enable or disable the function and transmitting a command via said first wireless transmitter; and at least one slave unit, said slave unit including a wireless receiver for receiving said command transmitted by said first wireless transmitter, and a second controller, connected to said wireless receiver, for controlling a function of the vehicle in response to said command.

Further scope of applicability of the present invention will become apparent from a review of the detailed description and accompanying drawings. It should be understood that the description and examples, while indicating preferred embodiments of the present invention, are not intended to limit the breadth of the invention since various changes and modifications within the spirit and scope of the invention will become apparent to those skilled in the art.

BRIEF DESCRIPTION OF THE DRAWINGS

The present invention will become more fully understood from the detailed description given below, together with the accompanying drawings which are given by way of illustration only, and thus are not to be construed as limiting the scope of the present invention. In the drawings.

DETAILED DESCRIPTION OF THE PREFERRED EMBODIMENTS

Figure 1:
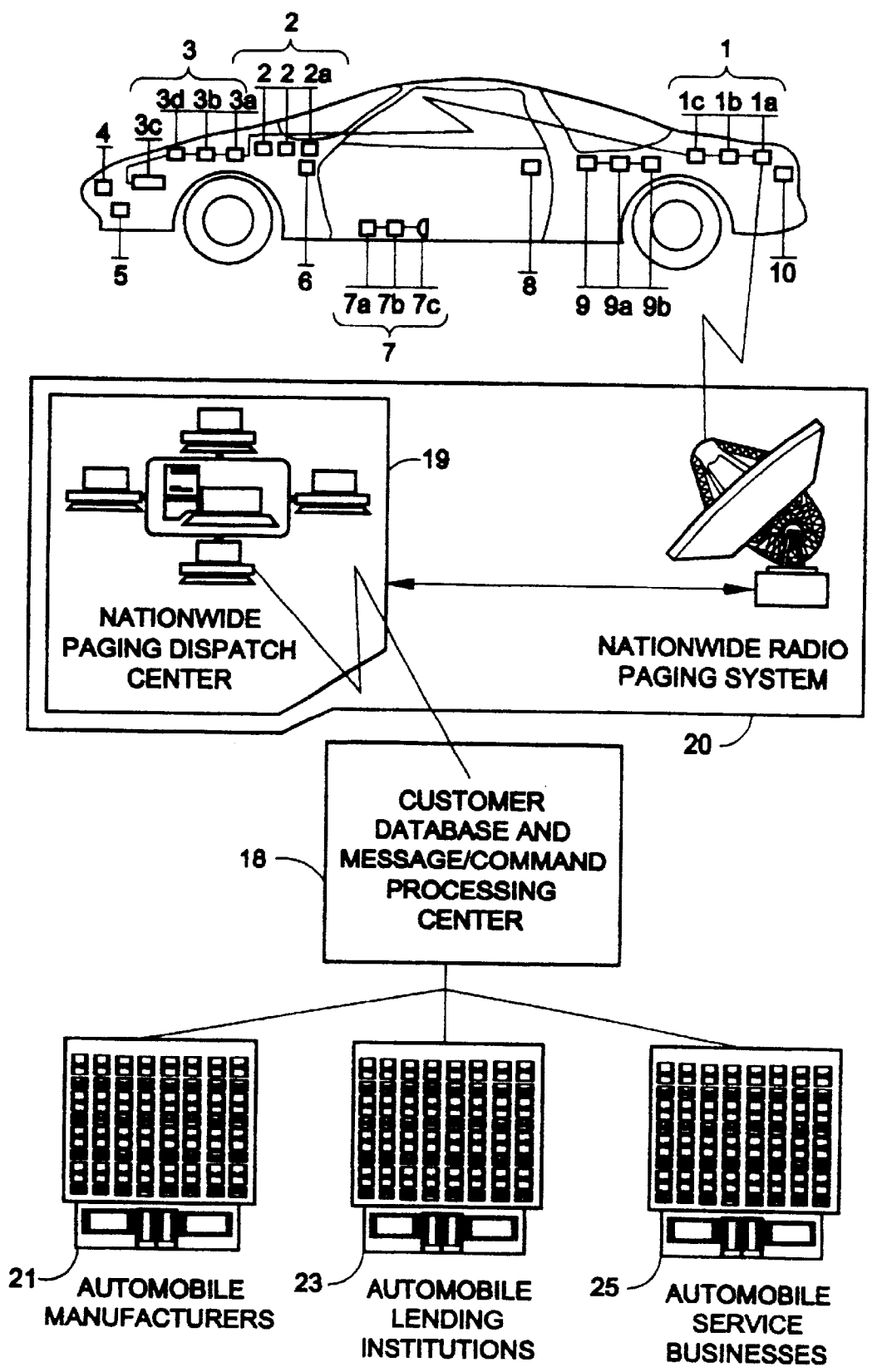
FIG. 1 shows a general overview of a system according to the present invention.

FIG. 1 shows a general overview of a system according to the present invention which is able to deliver and/or retrieve information and commands to/from a vehicle 13. The vehicle 13 includes a master relay control unit 1 which is in communication with main transmitter system 20 that is located at a fixed location. The system 20 includes a nationwide paging dispatch center 19 which receives information from a customer database and message/command processing center 18. The customer database and message/command processing center 18 has one or more subscribing customers, such as automobile manufacturers 21, automobile lending institutions 23, and automobile service businesses 25. The processing center 18 interfaces between its subscribing customers and automobiles which have in-vehicle communication systems according to the present invention, or, in the alternative, the agencies 21, 23, 25 can operate their own paging services in order to communicate directly with the vehicles 13.

Although FIG. 1 illustrates an automobile 13, it should be understood that the present invention can be used with any type of vehicle, including land, sea, and air vehicles.

Also, preferably more than one transmitter is associated with the paging dispatch center 19 in order to cover larger geographical regions. Each individual transmitter transmits substantially simultaneously to provide the overall desired geographical coverage. Because the physical manifestation of the transmitter is not critical to the operation of the present invention, satellite or other non-stationary or stationary communication stations can also be used.

In operation, the transmitter system 20 according to the present invention transmits a digital signal over a radio frequency to a main receiver 1a which is part of a master relay control unit 1 maintained on board vehicle 13. Preferably, the main transmitter 20 and the main receiver 1a are pager-type transmitters and receivers such that the radio signal is simultaneously transmitted from a plurality of pager transmitters 20 throughout the geographical territory where the vehicle 13 may be located. Regardless of the location of the vehicle, the transmitted signal can therefore be received by the main receiver 1a on board the vehicle 13. Preferably, both the transmitter and receiver are digital type radio equipment to allow the use of encoded digital signals. In this manner the security and reliability of the system can be maximized. Circuitry within the main receiver 1a for detecting digital paging messages is known in the art, and therefore is not further elaborated herein.

In FIG. 1, the master relay control unit 1 is shown installed in the trunk of vehicle 13. A controller 1b is preferably a micrologic controller such as a microprocessor, and interprets the coded message received by the main receiver 1a. The controller 1b is in electrical communication with the main receiver 1a. Also connected to the main receiver 1a and the controller 1b is a wireless digital radio transmitter or transceiver 1c capable of transmitting a series of predetermined digital codes. This digital radio transmitter or transceiver 1c is capable of transmitting digital codes to a plurality of slave units 2, 7, etc. installed in the vehicle, each of which includes a digital receiver or transceiver 2a, 7a, etc. A plurality of these slave units are provided, preferably being in wired electrical communication with respective relay-based accessories or system features.

Typically, a vehicle is provided with manual switches which the user controls in order to activate an accessory or other vehicle function. For example, a button might activate the door locks, and a key might activate the starter motor. In the circuits for these accessories, a relay is used to isolate the manual switch from the high power loop between the vehicle battery (or other power source) and the accessory itself. This avoids the possibility of unwanted power entering the manual switch and perhaps giving a shock to the user. These accessories and features may include the dashboard display which is associated with the inventive slave unit 2; starter motor which is associated with slave unit 3; vehicle lights with 4, such as headlights, brake lights, turn signals, interior lights, etc., or any subset of them; vehicle horn with 5; ignition switch with 6; alarm with 7; door locks with 8; trunk lock with 10; and/or any other relay-based electrical system within the vehicle. Another slave unit 9 is associated with a GPS (Global Positioning System) unit as described in further detail later herein.

The slave units according to the present invention are used in conjunction with the pre-existing relay devices mounted within the vehicle. The slave units include respective receivers or transceivers, controllers, and their own internal relays or electronic switches, as illustrated separately for dashboard display 2, the starter motor 3, and the GPS unit 9, but it should be understood that the other accessory systems also incorporate similar receivers or transceivers, controllers, and relays/switches.

Preferably, the master relay control unit uses a distinct encoded signal to communicate with each slave unit to be accessed, monitored or controlled. If one slave unit controls several relays, accessories, and/or systems then the slave unit can be responsive to a plurality of distinct encoded signals. Here, encoded signals such as the address or identity of the desired relay(s) may be in the form of a digital (e.g., binary) address on a carrier wave, or a distinct communication frequency for each slave, or a combination of the two. By sending one or more encoded signals operation of one or more vehicle features can be accessed, monitored or controlled. As will become apparent upon further description of the invention, the use of encoded digital signals transmitted from the transmitter 1c provides a secure and reliable system which, through the use of a single main receiver 1a, can access and/or monitor and/or control a plurality of features and accessories in the vehicle.

Non-relay based systems can also be incorporated into the present invention, such as a warning system slave unit 7. The slave unit 7 includes a digital receiver or transceiver 7a connected to a processor/timer control 7b which is in turn connected to message delivery and display device 7c such as a piezoelectric buzzer, a loudspeaker, or any other device that makes an audible warning. A visual display can be used to deliver static or dynamic visual messages in lieu of or in addition to audible signals and warnings. The processor/timer control 7b controls delivery to the vehicle operator of an audio or visual warning originating from the paging system 20 or the main relay control unit 1. If originating from the paging system 20, then the warning is received as a paging message by main receiver 1a, interpreted by the controller 1b, and retransmitted as a warning command through the wireless digital radio transmitter 1c to the digital receiver 7a. If originating from the main unit 1, then the controller 1b will generate the warning message, either upon self-initiation due to its own programming or due to receipt of an instruction from the transmitting system 20 which the master unit 1 believes should be combined with a warning. Once received by the receiver 7a and interpreted by the processor/timer control 7b, the warning system initiates the process of providing an audible and/or visual message to the users of the vehicle. Messages may include warnings prior to or concurrently with the enabling or disabling a particular function in the vehicle; notifications or instructions to the owner/operator; or even advertisements.

The warning system timer control 7b may be provided with a memory storing a plurality of different warnings. Upon interpreting the incoming command from the transmitter 1c, the timer control 7b will choose the proper one(s) of the stored warnings to sound and/or show to the users of the vehicle. The warnings can sound like a recognizable buzz, a spoken instruction, etc. The visual warning can be a flashing light, a scrolling set of words, etc. Typically, the audio and visual warnings will use dedicated audio and visual warning devices, but use of the vehicle's pre-existing audio and/or visual devices are also possible.

As an example, prior to disabling the vehicle's starter mechanism, the warning system 7 can provide an audio warning to the occupants to perform certain actions. The processor/timer control 7b could repeat the audio warning over a predetermined period with predetermined intervals, such as 10 beeps on the hour and half-hour for 24 hours, so that the operator will receive a plurality of prior warnings of the enablement or disablement of certain functions of the vehicle.

The command transmitted by the controller 1b through the in-vehicle transmitter 1c may trigger only the warning system 7, or may trigger both the warning system 7 and one or more of the appropriate relay based systems so that a vehicle function is disabled or enabled and at the same time the operator is warned.

FIGS. 2(a) to 2(d) illustrate how slave units according to the present invention can be connected to their associated device or function. The vehicle accessory 205 is connected in a high power loop 207 to a power source 211 and a pre-existing relay 209. A manual switch 213 is also connected to the pre-existing relay 209 in a low power loop 215. Assuming that the pre-existing relay 109 is normally open, the user may actuate the manual switch 213 in order to close the pre-existing relay 209. Once the pre-existing relay is closed, the high power loop 207 is closed thereby supplying power to vehicle accessory 205. Thus the manual switch activates the vehicle accessory. However, the slave unit according to the present invention is also inserted into the high power loop 207 thereby adding another relay or electronic switch to the loop. Assuming that the slave unit relay 203 is normally closed, the vehicle accessory is activated as just described. But if the receiver 201 detects a command to open the slave unit relay 203 then the relay 203 is opened thereby disabling the high power loop 207 and thus the vehicle accessory 205. In other words, even if the user actuates the manual switch 213, the vehicle accessory 205 will be unable to activate because it will not receive any power. For example, if the slave unit relay 203 is in the power line for the vehicle's starter motor, then opening the relay 203 will disable the user from engaging the starter motor thereby preventing the vehicle's engine from starting.

As an alternative to the above, and depending on the vehicle accessory being controlled, it is possible to use a normally open switch for the slave unit relay 203.

Figure 2A:
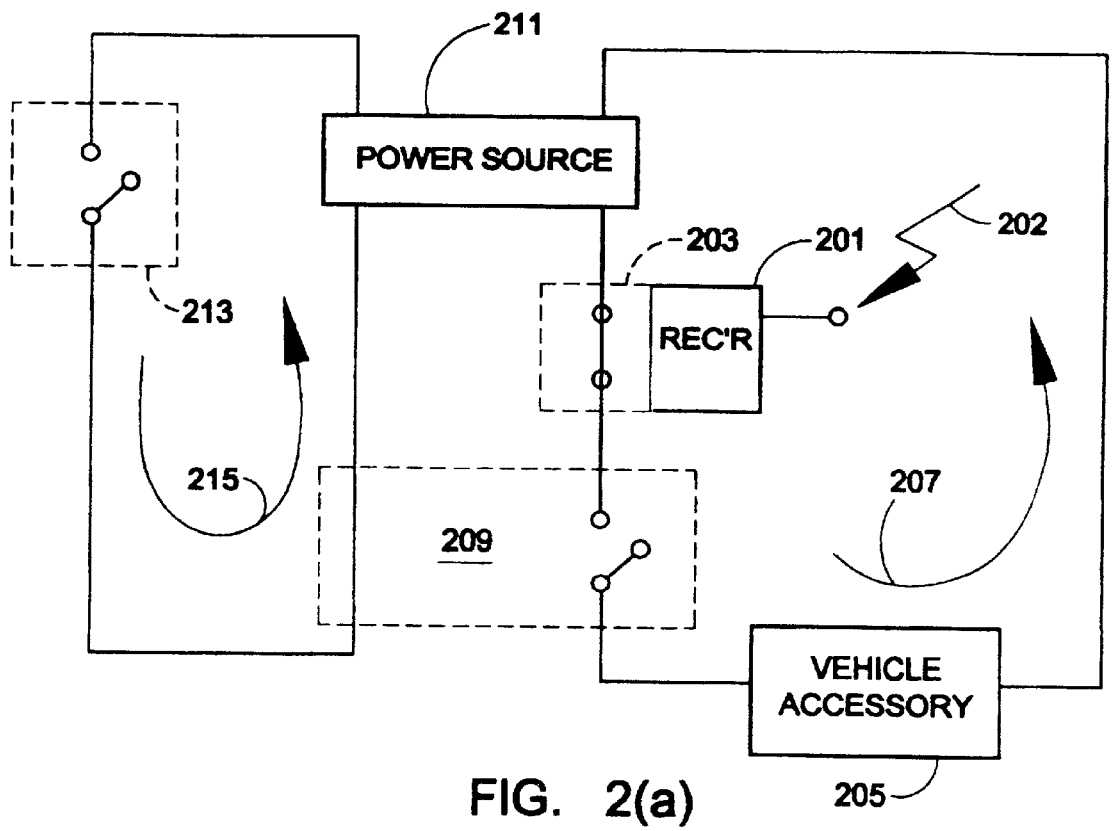
FIGS. 2(a) through 2(d) illustrate connections between slave units and their associated devices or functions according to different embodiments of the present invention.

The connection of the slave unit relay 203 to the vehicle power source 211 is omitted from FIG. 2(a) for simplicity. The receiver or transceiver 201 contains appropriate circuitry such as a programmed microprocessor for interpreting commands transmitted from the master in-vehicle transmitter 1c and for opening the relay 203 when the relay 203 is identified in the command 202. In this manner, the present invention allows a digital paging signal to disable or enable certain features and accessories in the vehicle.

Figure 2B:
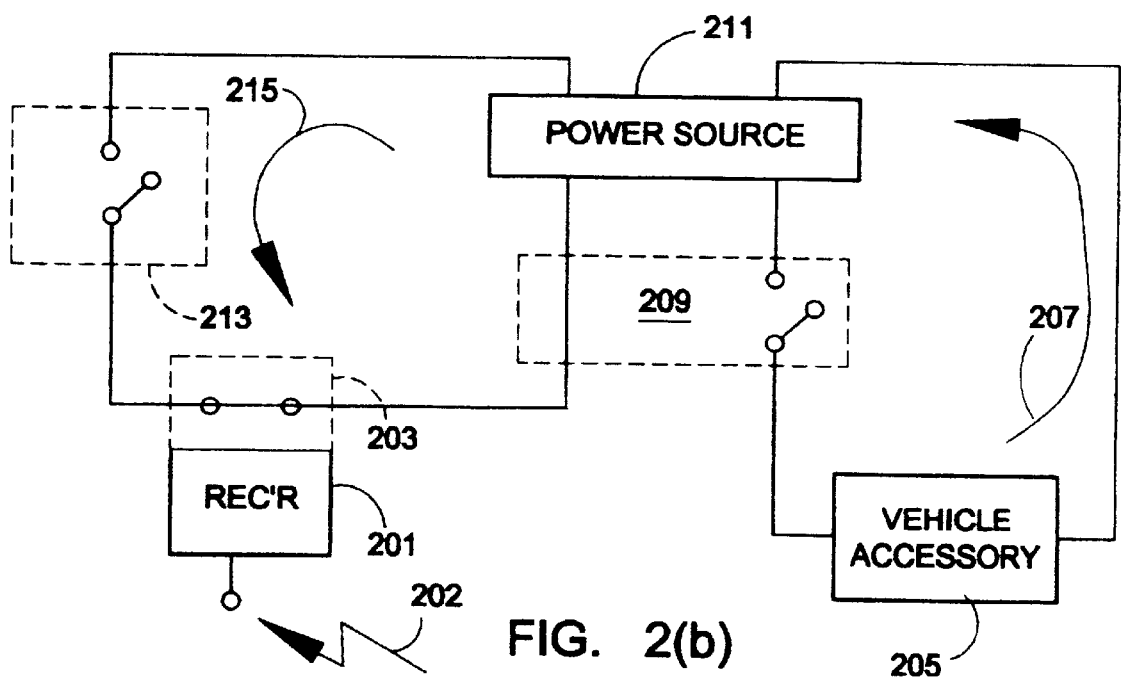
Figure 2C:
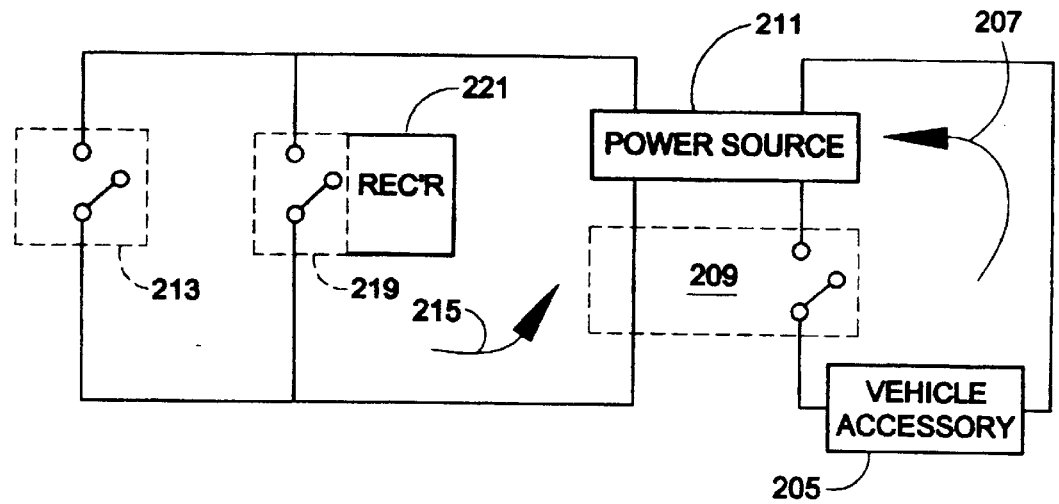
Figure 2D:
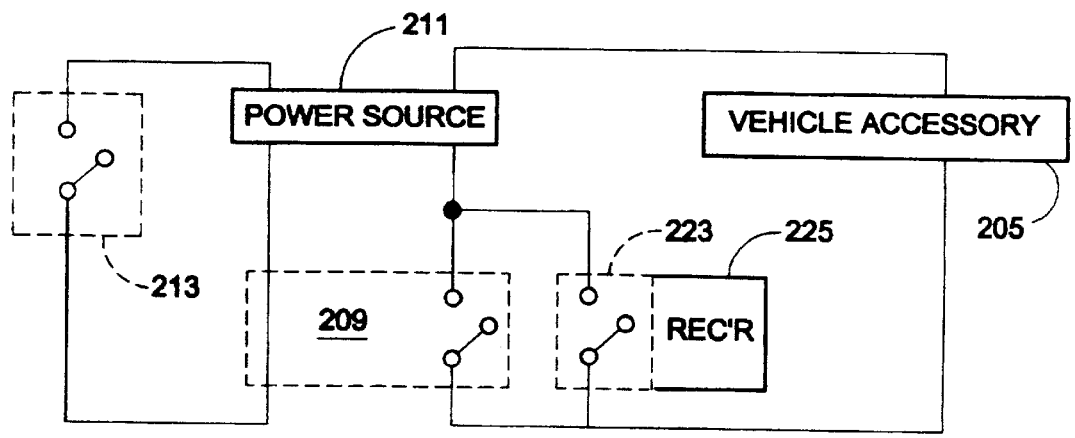

In FIG. 2(b), another embodiment of the present invention is shown. A slave unit having a receiver or transceiver 219 and relay 217 is connected in the low power loop 215 between the manual switch 213 and the power source 211, instead of in the high power loop 207 which includes the power source 211, the vehicle accessory 205 and the pre-existing relay 209. As with FIG. 2(a), the connection of the relay 217 to the vehicle's battery or other power source is omitted for simplicity. In this embodiment, the ability of the manual switch 213 to close the normally open pre-existing relay 209 is disabled when the normally closed slave unit relay 217 is opened. Opening the slave unit relay 217 opens the low power loop 215, thereby removing power from the pre-existing relay 209 rendering it incapable of closing.

In FIG. 2(a), the slave unit relay 203 must be able to tolerate whatever peak power may exist within the high power loop 207. Preferably, the relay 203 is the same type of electromagnetic relay that is used for the pre-existing relay 209. However, it is more preferable from the point of view of cost to design one standard slave unit relay 203 which can be used in any of the high power loops present in a plurality of vehicle types. Although a high power relay 203 can be used in the embodiment of FIG. 2(*b*), it is also possible to use a weaker relay as the slave unit relay 217 because it is used in a lower power loop 215. The weaker slave unit relay 217 can be of the electromagnetic type but it can also be a simply electronic switch. It can be as simple as a two-input AND gate having the power source on one input line, an ON/OFF signal on the other input line, and the output leading to the manual switch. It is within the level of skill for the artisan to use other switches for the relay 217 as well.

The embodiments of FIGS. 2(*a*) and 2(*b*) can be combined in order to provide a redundant way to disable or enable the vehicle accessory.

Using the present invention, it is possible for the transmitter system 20 to send an instruction identifying a particular vehicle and a particular function to be disabled or enabled. The main relay control unit 1 receives and interprets the instruction, and if the instruction identifies the vehicle 13, then the in-vehicle transmitter 1c sends a wireless command to the slave receivers or transceivers which control the relay-based accessories or functions in the vehicle. Only those receivers or transceivers which are identified in and recognize the wireless command will open or close their relay(s), as the case may be, in order to disable or enable the vehicle function which is the target of the command.

FIG. 2(*c*) illustrates yet another embodiment of the present invention. The slave unit relay 219 is connected to the power source 211 in parallel with the manual switch 213. The relay 219 is a normally open switch which, when in its open state, allows the manual switch 213 to control the operation of the vehicle accessory. Upon receipt of the appropriate command by the receiver or transceiver 221, the slave unit relay 219 closes thereby supplying power to the pre-existing relay 209 and forcing the relay 209 to close. By doing so, the slave unit relay 219 activates the vehicle accessory 205 regardless of the state of the manual switch 213. This embodiment may be useful with accessories such as vehicle lights, horn, or door locks in order to force them to activate. The receiver 221 can also be programmed to periodically open and close the slave unit relay 219 in order to flash the vehicles lights, flash the horn, etc. As with the other embodiments, it is possible to substitute a normally closed relay for the normally open slave unit relay 219.

FIG. 2(*d*) shows yet another embodiment of the present invention. The slave unit relay 223 is connected in parallel with the pre-existing relay 209. The slave unit relay 223 is a normally open switch which, when in its open state, allows the pre-existing relay 209 to control the operation of the vehicle accessory 205. Upon receipt of the appropriate command by the receiver or transceiver 225, the slave unit relay 223 closes thereby supplying power to the vehicle accessory 205 and forcing it to operate. By doing so, the slave unit relay 223 activates the vehicle accessory 205 regardless of the state of the manual switch 213 and/or the pre-existing relay 209. This embodiment may be used in situations such as those described in relation to FIG. 2(*c*). In FIG. 2(*d*), however, the slave relay 223 may have to withstand higher power than slave relay 219 of FIG. 2(*c*) because the vehicle accessory 205 likely consumes more power than the coil of the pre-existing relay 209. As with the other embodiments, it is possible to substitute a normally closed relay for the normally open slave unit relay 223.

The embodiments shown in FIGS. 2(*a*) through 2(*d*) can also be used with non-relay based systems. For example, the slave unit relay in the warning system 7 is not used in conjunction with a pre-existing relay but rather as a switch for actuating the audio and/or visual warning device. Referring to FIG. 1, the warning system includes a digital radio receiver or transceiver 7a connected to the timer control 7b. The timer control 7b may include the memory described earlier, and preferably includes a signal generator for generating sound signals corresponding to the audible warning broadcast to the vehicle operator. Voltage waveforms generated by the signal generator are done in a manner know to those skilled in the art and therefore are not described further herein. The voltage waveforms are provided to the audible output device 7c. In a purely visual version of the warning device, the controller 7b includes a visual message processor unit. The visual processor unit operates in a manner similar to the timer control by selecting an appropriate warning display from memory. It may be integrated into the timer control when the warning device is both an audible and visual warning device. Depending on the type of visual display, the processing unit 7b can generate signals for a flashing light and/or alphanumeric character sets for display on a visual output device 7c. Connections to power and ground are not shown in FIG. 1 for simplicity.

FIGS. 3–7 show general constructions of the master and slave units according to the present invention. In FIGS. 3(*a*) and 3(*b*), construction of the main receiver 1a and digital radio transmitter 1c includes installation on a single platform 302, with the controller 1b being integrated into printed circuit cards carrying the main receiver 1a or the transmitter 1c or the platform 302. Appropriate wired connections join them to each other, and a suitable cover (not shown) encapsulates the components and shields them from damage and from view. Covers are not shown in FIGS. 3(*a*)–7(*b*), but they are preferably provided and are preferably formed with the same cosmetic appearance as relays that pre-exist in the vehicle. In this manner, the devices will appear to be standard devices, thus making the system difficult to locate or detect.

Because the master and/or slave relay units of the present invention can be manufactured as individual replacement relays for the vehicle's factory installed relays, it is possible to make their visual appearance identical or nearly identical to that of the factory installed relays. By employing the present invention, the user of the vehicle 13 remains unaware that the slave relay unit is not the factory installed relay, but rather a "smart" relay which is controlled by an in-vehicle transmitter and can disable and enable a particular vehicle function, such as the starter motor, at will.

The components 1a–1c could also be integrated into a single printed circuit card. Together, they form the master relay control unit 1 that is small in size on the order of a few inches or smaller, making it easy to install out of sight. The unit 1 may include three electrical power connectors 304 arranged at right angles to one another in the manner arranged on known relay units. Using this arrangement, the master relay control unit 1 can be connected to receive power and ground from a plug socket installed in the vehicle. It also may be plugged into a pre-existing relay plug in the vehicle, in which case a relay 306 should be provided in order to substitute for the pre-existing relay that was removed. By using a pre-existing relay plug socket, the main relay control unit 1 becomes even more difficult to detect. If not plugged into a pre-existing relay plug socket, then the relay 306 is preferably omitted. Other physical designs for the master control unit 1 are also possible since its appearance is not critical to its operation. Preferably, however, the master control unit 1 is installed in a place in the vehicle where it is not easily detected.

The transmitter 1*c* is preferably a 300 MHZ transmitter which has sufficient range to be in radio communication with the digital radio receivers or transceivers placed throughout the vehicle.

The digital radio receivers and their relays are designed as slave units 308 to the master relay control unit 1, as shown in FIGS. 3(*e*) and 3(*f*). Using receiver 2*a* and relay 2*b* as an example, the digital radio receiver, which is preferably a 300 MHZ receiver, is incorporated in the relay slave unit 308 together with the relay 2*b*. The receiver 2*a* and relay 2*b* are preferably mounted on a single relay platform 310 which operates a particular vehicle function, such as the dashboard display. Electrical connectors 304' are also present to permit the unit 308 to be connected into the appropriate relay plug in the vehicle.

Figure 8:
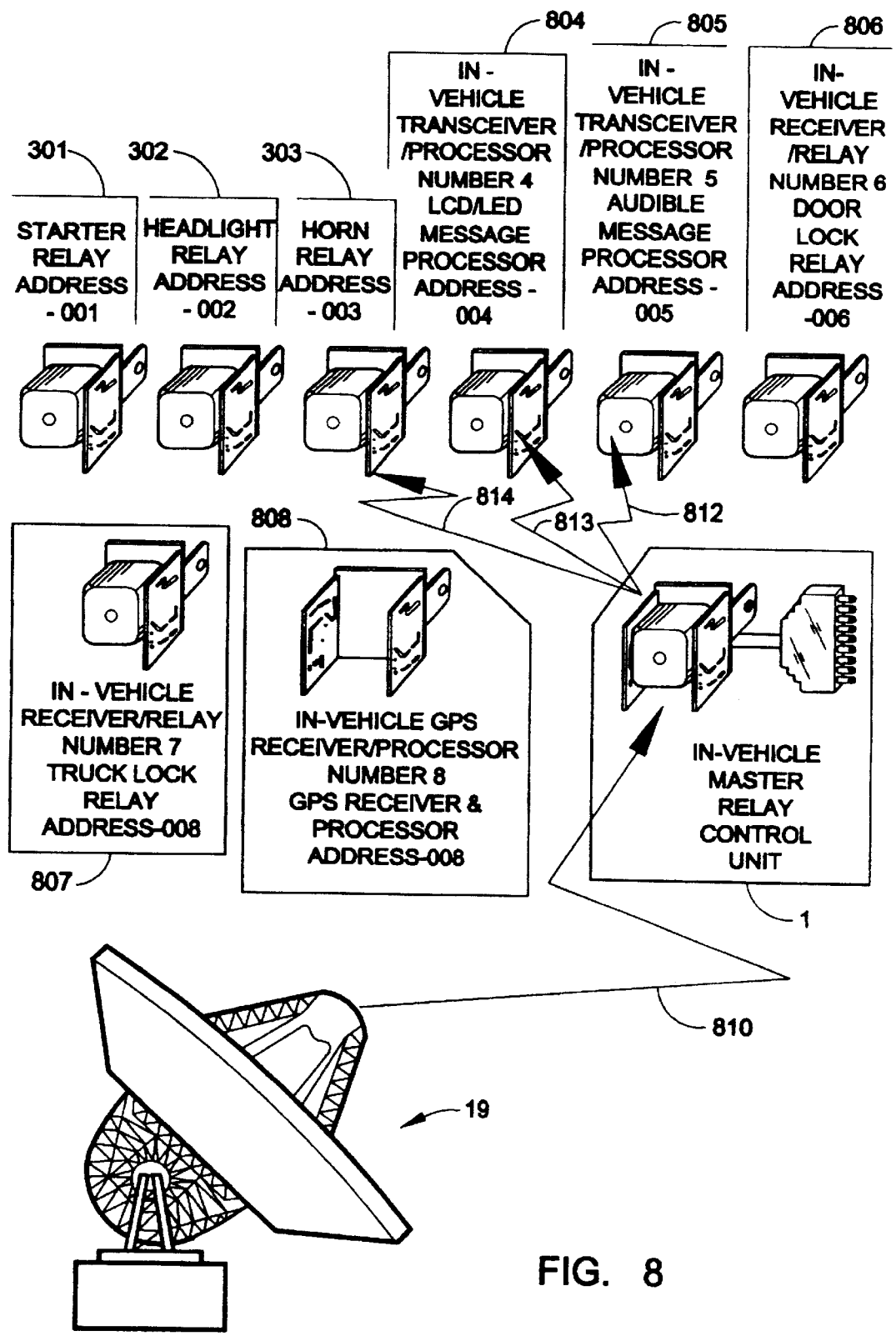
FIG. 8 provides an example of the communication interface among components of a system according to an embodiment of the present invention.

A general illustration of the overall system is provided in FIG. 8. A series of slave relay units 801–808 are disposed within the vehicle (not shown). Each slave relay unit is associated with a respective function in the vehicle, although one slave relay unit may also be connected to control more than one function. In FIG. 8, unit 801 controls the inventive relay for the starter motor; unit 802 controls the inventive headlight relay; unit 803 controls the inventive horn relay; unit 804 controls a liquid crystal display (LCD) or light emitting diode (LED) or other visual display device; unit 805 controls an audible message device; unit 806 controls the inventive relay for the door locks; unit 807 controls the inventive relay for the trunk lid; and unit 808 controls a GPS processor. In the preferred embodiment, each slave relay unit will have a respective receiver and a respective identifier or address, such as 001 through 008. The address can be hidden as binary digits within the command transmitted by the master relay control unit 1, or it can be configured as a respective frequency transmitted by the master relay control unit's transmitter 1*c*. For example, the frequency of 300 MHZ is used when transmitting commands to a first slave unit, and a frequency of 310 MHZ is used whenever commands are transmitted to a second slave unit.

The receivers in each slave unit 801–808 include appropriate circuitry for detecting and interpreting the wireless signals from the transmitter 1*c* of the master relay control unit 1.

Such circuitry is well known to those skilled in the art, and therefore it will not be elaborated herein.

The master relay control unit 1 receives paging transmissions 810 from the main transmitter system 19 and, after deciding which of the slave relay units 801–808 is to perform a control, monitoring, or other function, transmits one or more wireless commands 812–814 to the slave units. The slave units detect the wireless commands, determine whether they are identified in the command and, if so, execute the command. The wireless command may identify the function to be performed, such as "make sure the relay is open," or the slave relay unit may automatically perform a predetermined command such as "switch the relay to the other state" whenever it detects its address in the command. In the latter situation, there is no need for the command to identify the function to be performed.

In an alternative embodiment shown in FIGS. 3(*c*) and 3(*d*), the present system can function through the use of a stand alone pager-type main receiver 312 installed on a particular relay platform 314 which operates a particular vehicle function, for example the starter motor. In this configuration, the stand alone main receiver 312 includes the pager receiver 1*a* which receives the signal from the main transmitter 20 of the paging dispatch center 19 in a manner similar to the master unit 1, but rather than transmitting a command to a slave unit, the stand alone main receiver 312 houses the relay 316 on the relay platform 314. In this auxiliary embodiment, the main receiver is necessarily plugged into the relay plug associated with the vehicle function being controlled. It is possible to omit the in-vehicle transmitter 1*c* because the main receiver 312 includes controller 1*b* (not shown) to perform the functions that otherwise would be performed by one of the slave units 308. In other words, the embodiment of FIGS. 3(*c*) and 3(*d*) houses both a relay which replaces the vehicle's pre-existing relay, and the switch as discussed in relation to FIGS. 2(*a*) through 2(*d*). The transmitter-free embodiment shown in FIGS. 3(*c*) and 3(*d*) is useful when only one function in the vehicle is to be enabled/disabled, but it is also possible to mount several of such stand alone units 312 in the vehicle in order to control several functions, in which case a respective identifier would be used for each unit 312 and all units 312 would listen to the messages transmitted from the paging system 19.

Preferably, however, the transmitter 1*c* of FIGS. 3(*a*) and 3(*b*) is used in the unit 312 of FIGS. 3(*c*) and 3(*d*). In this embodiment, the main unit 312 itself controls one of the vehicle's functions and, for all other functions, it transmits commands to the slave units that are associated with those functions.

Each of the embodiments shown in FIGS. 3(*a*)–3(*f*) allow for easy installation of the present invention because most slave units 308 can be plugged into relay plug sockets similar to those already present within the vehicle. The same is true for the stand alone paging unit 312. The master relay control unit 1 can likewise be fitted into an existing relay plug, or into a specially added relay plug, or it can be designed in a completely different way and mounted discretely in the vehicle. What is important is that the present invention is extremely versatile in allowing its components to be hidden from detection.

Additional discussion of the one-way communication scheme usable in the present invention, and apparatus therefor, is found in copending U.S. patent application Ser. No. 09/212,811, filed Dec. 16, 1998, the entire contents of which are hereby incorporated by reference.

In an alternative embodiment shown in FIGS. 4(*a*)–4(*f*) the receiver devices are replaced by transceivers. In FIGS. 4(*a*) and 4(*b*), the master unit 401 includes a transceiver 403 which replaces the main receiver 1*a* of the embodiment shown in FIGS. 3(*a*) and 3(*b*). In FIGS. 4(*c*) and 4(*d*), the stand alone main receiver 407 includes a pager receiver/transmitter 405 which replaces the pager receiver 1*a* of FIGS. 3(*c*) and 3(*d*). In FIGS. 4(*e*) and 4(*f*), the slave unit 411 includes a 300 MHZ transceiver 409 which replaces the receiver 2*a* of FIGS. 3(*e*) and 3(*f*) Other components shown in FIGS. 4(*a*)–4(*f*) are constructed and operate in the same manner as described for FIGS. 3(*a*)–3(*f*) Use of the transceiver devices instead of the receiver units provides the ability of each stage in the communication scheme to obtain verifications that its messages have been received. For example, the transceiver 403 allows the pager transmitting system 20 to receive an acknowledgment signal from the in-vehicle master relay unit that its instruction has been received. This acknowledgment signal from the vehicle to the paging system preferably contains an identifier identifying the vehicle. Likewise, the master relay unit may obtain acknowledgment signals from one or more of the slave relay units 307 that its commands have been received. In those situations in which a slave relay unit 307 or the warning system 7 performs an accessing, monitoring, controlling, and/or warning function on its own, such as when it is programmed to do so at a predetermined time of day or after expiration of a predetermined time period, then the transceiver units permit a signal to be sent to the master relay control unit informing it of such accessing, monitoring, controlling and/or warning function. If necessary, the master relay control unit can then send an additional signal to that effect to the transmitting system 20. A combination system can also integrate some slave units having solely the receiver 2b, and some slave units having the transceiver 409.

The transceiver embodiments can also be understood with reference to FIG. 8. The earlier description of the figure pointed out one-way transmissions from the main transmission system 19 to the master relay control unit 1, and from the master relay control unit 1 to the slave units 801–808. In the transceiver embodiments, any or all of those transmissions can be followed by an acknowledgment transmission from the slave unit to the master relay control unit 1, and/or from the master relay control unit 1 to the main transmitter system 19. As pointed out elsewhere in this description, the transceivers can also initiate transmissions upon detecting certain alarm limits in the data that they monitor, or at predetermined time intervals (e.g., every hour or every day at noon).

The main relay platform based devices described above may also incorporate an optional wiring harness 301. See FIGS. 3(a)–3(d) and 4(a)–4(d). The wiring harness 301 preferably includes a male or female socket 303 joined to the relay platform by a flexible cable 305, although the socket 303 can be secured directly to the relay platform. Specific wiring lines in the wiring harness 301 are used to hardwire power and/or vehicle electrical functions to the master relay control unit 1 or to the stand alone unit 312 if hardwiring is more effective or the vehicle does not contain the necessary pre-installed relays that would otherwise be replaced as discussed above. The microprocessor or other controller in the unit may also be programmed to expect specific inputs and outputs on the wiring lines of the socket 303. Alternatively for manufacturing efficiency, it may be more cost effective to manufacture a single master receiver/transceiver/relay unit that is useable in a variety of vehicles types and for a variety of functions and features. In this manner, a single device having the wiring harness can be used for wireless transmissions of commands and hardwired receipt of vehicle information from onboard vehicle data processors. The wiring harness 301 can also be used on the slave units, as further described in relation to FIGS. 5(a) and 5(b).

As those skilled in the art will appreciate, the transmitter, receiver and transceiver devices disclosed herein could utilize a standard plug-type relay platform, a relay platform with a wiring harness interface, or a plugless relay with the wiring harness interface. The wiring harness is likely to make the present invention conspicuous and easy to detect and disconnect. It is therefore less favorable than the wireless embodiments.

Using the foregoing combination of components, a system according to the present invention can be easily installed within an automobile or other vehicle by supplementing stock relays or electrical components with specialized relays or electrical components as described above. In this manner, the entire system is a wireless type system and does not require the direct electrical connection of the master unit 1 with the particular components throughout the automobile. This results in a much more cost-effective product in terms of component costs and installation, and a system which is much less likely to be found by anyone wanting to remove it.

While the system uses primarily existing relays and other electrical devices to control vehicle systems, additional relays or devices may be installed to control non-relay based systems, to provide redundancy (e.g., by connecting plural inventive relays in series or in parallel) or to reduce system tampering or system disablement. In addition, the circuitry according to the present invention can be such that one relay controls a plurality of vehicle functions.

In operation, the transmitter system 20 will transmit a signal such as a numeric code over the air to the in-vehicle receiver 1a. The signal may be a 900 MHZ radio signal for maximum range and clarity, and preferably includes a vehicle identifier which identifies the vehicle to which the signal is addressed, and an instruction to enable or disable a particular function or functions. The receiver (or transceiver) 1a passes the signal to the controller 1b for interpretation. If the controller recognizes the signal as an instruction to enable and/or disable one or more functions in the vehicle, then the controller 1b transmits a command through the in-vehicle transmitter (or transceiver) 1c over the air to the digital receivers (or transceivers) installed within the housings of the slave relay units. The command includes an identifier of the desired relay and an instruction to enable or disable the function associated with that relay. Alternatively, the command may include plural identifiers for a plurality of desired relays, and instructions to enable and/or disable the functions associated with those relays. Once the desired one(s) of the slave units' receivers hears its address, it will follow the instruction to open or close the associated relay in order to disable or enable the function. Preferably, the relays are normally-closed or normally-open relays, allowing the command simply to contain the address of the desired relay. In this case, the relay's receiver will cause the relay to switch states between open and closed whenever it hears its address. The receiver may also include an automatic timer which re-enables the function after a predetermined period of time. It should be understood that the meaning of "disabling" and "enabling" a function in the vehicle depends on the point of view. For example, turning something "off" may be considered disabling that function, and can also be interpreted as enabling a "lockout" state. Therefore, the context of the function might influence the understanding of whether it is being disabled or enabled.

In operation, the present system can be utilized for a number of purposes. For example, it can be used by an automotive finance company or lending institution (FIG. 1) to ensure that the borrower keeps current on his payments to the lending company. This application provides an automotive finance credit company with a method of collection enforcement. If the borrower becomes late in making his scheduled payment then the lender can, through the transmission of the appropriate signal to the vehicle, initiate a warning sequence in the vehicle. If the borrower does not take the necessary actions to satisfy his account, the lender can transmit a signal to disable the starter of the automobile. In this manner, while the car itself will not be disabled if it is already running, the car is prevented from restarting after the engine has been turned off. Once the borrower's account is brought current, the system of the present invention can be used to re-enable the starter system. In this case, the lender can either directly control the paging transmitter 20 which transmits the warning and disable signals or, as shown in FIG. 1, the lender can be in communication through ISDN, dedicated lines, or whatever type of communication is most convenient, with a separate entity such as the National Dispatch Center (NDC) 19 which transmits such signals using a proprietary nationwide communication network and a nationwide paging service provider. The dispatch center 19 preferably has access to a customer database 18 in order to know which vehicle to communicate with. The use of a paging system is advantageous because it allows transmission of the signals to all geographical regions where the vehicle may be, simultaneously. It would be very difficult for a user to successfully escape the geographical reaches of the lender.

Because the present invention can be used to disable the starter motor of the vehicle, it is advantageous and safer than theft deterrent systems which turn off the vehicle's engine as it is moving.

Still further, the present system can be utilized by automobile associations or rental companies to automatically unlock the vehicle doors and/or trunk from a remote location upon receiving information that the owner or renter has locked the keys in the car. Still another use of the present invention is with law enforcement. Cars can be immobilized by disabling the starter or the ignition system, meaning that drivers convicted of automobile violations such as driving under the influence can be prevented from using their cars altogether by simply installing the present invention. Drivers can also be prevented from using their cars during only certain hours of the day by disabling it at certain times and reenabling it at others. The re-enablement can be done by subsequently transmitted signals, or by using an automatic timer within the controller 1*b* of the master relay control unit 1 or within the receivers (or transceivers) included in the slave units.

The embodiments of FIGS. 4(*a*)–4(*f*) allow the present invention to employ acknowledgment pager transceivers. In these embodiments, an acknowledgment pager system can be used not only to send instructions to the vehicle 13, but also to confirm receipt of the instruction and/or to retrieve information from the vehicle 13. This provides a more reliable system in that the instructions or requests for information can be re-transmitted by the pager transmitting system 20 if an acknowledgment is not received from the vehicle within a predetermined time after initial transmission. Similarly, the transceivers on board the slave units 411 can transmit receipt confirmations or other information to the master relay control unit 1 for processing or for retransmission to the pager transmission system 20.

FIGS. 5(*a*) and 5(*b*) provide another type of slave unit which may be used in the present invention. The processing slave unit 501 incorporates a processor unit 503 containing logic circuitry and/or one or more data processors 505 that are programmed to perform designated functions. These functions include accessing, monitoring and/or controlling vehicle accessories as described above or in-vehicle processors such as engine or performance monitoring devices and sensors which are installed by the manufacturer or added later. The processor unit 503 preferably communicates with the master relay control unit 1 through digitized encoded messages exchanged via a transceiver 507 contained within the processor slave unit 501. The encoded and digitized messages can then be transmitted by the master relay control unit 1 to the Nationwide Radio Paging System 19, if necessary, and to the customer database and message/command processing center 18 and subscribing customers.

In processing slave unit 501, an interface unit 509 is provided for hardwired connection (not shown) to known in-vehicle data processors or computers which monitor engine or vehicle functions such as exhaust contents, distance traveled, miles per gallon, etc. For those in-vehicle data processors which have input/output ports, the processing slave unit can be connected to the appropriate ports using a wiring harness similar to harness 301 used in the master units of FIGS. 3(*a*) through 3(*d*). For those in-vehicle data processors which do not have input/output ports, then they can be physically opened and accessed so that the desired signals are input or output to/from the processor. Those skilled in the art are cognizant of other methods of obtaining information second-hand from such processors, such as by detecting electric fields around wires which carry the information in the form of electric current. Such methods are within the level of skill of the artisan and need not be further detailed herein.

The processor unit 503 within the slave unit 501 can either accumulate or process predetermined data from these in-vehicle computers and report the results to the master relay control unit 1. The reports can be made at prescribed time intervals, upon request from the master control unit 1, or when the data reaches certain alarm limits. Regardless when they are made, the master control unit 1 then uses its own programming to decide whether to report these data to the paging system 19 and/or to command one or more of the in-vehicle slave units to perform certain functions. These functions may include anything from disabling a certain vehicle function to broadcasting an alarm to the users of the vehicle. The processing slave unit 501 itself may have an associated audio and/or visual alarm which broadcasts an alarm to the users of the vehicle at the same time that a report is transmitted, via the transceiver 507, to the master control unit 1. As another alternative, the alarm system 7 according to the present invention is responsive not only to the commands transmitted from the master relay control unit 1, but also to reports transmitted from one or more of the processing slave units 501.

Figure 6A:
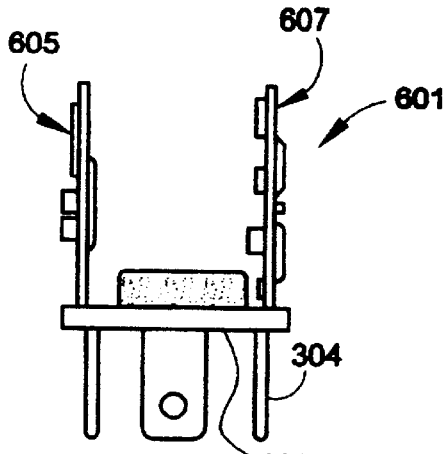
FIGS. 6(a) and 6(b) show the assembly of a slave unit according to a still further embodiment of the present invention.
Figure 6B:
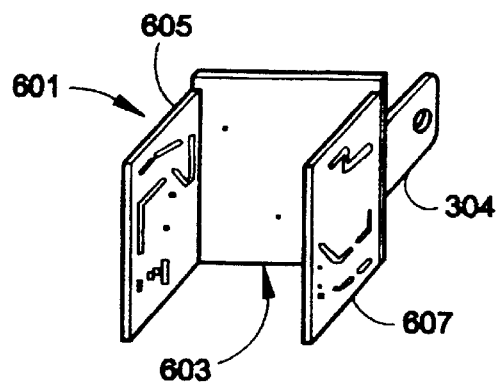

FIGS. 6(*a*) and 6(*b*) illustrate yet another type of slave unit which may be used with the present invention. A GPS (Global Positioning System) slave unit 601 incorporates a GPS receiver 603 and a microprocessor and/or logic circuitry 605. The processor 605 uses information from the GPS receiver 603 in a known manner to determine the geographical location of the GPS slave unit 601. Data regarding the location is processed and converted to a digitized signal that is transmitted by transceiver 607 to the master relay control unit 1. The transceiver 607 is preferably a 300 MHZ transceiver contained within the GPS slave unit 601. As noted above with the processor slave unit 501, the encoded and digitized data can also then be transmitted by the master relay control unit 1 to the Nationwide Radio Paging System 19 and the customer database and message/command processing center 18 and subscribing customers.

Figure 7A:
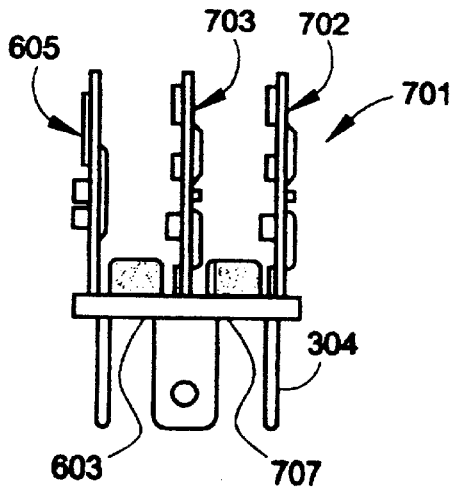
FIGS. 7(a) and 7(b) show the assembly of a GPS slave unit according to the present invention.
Figure 7B:
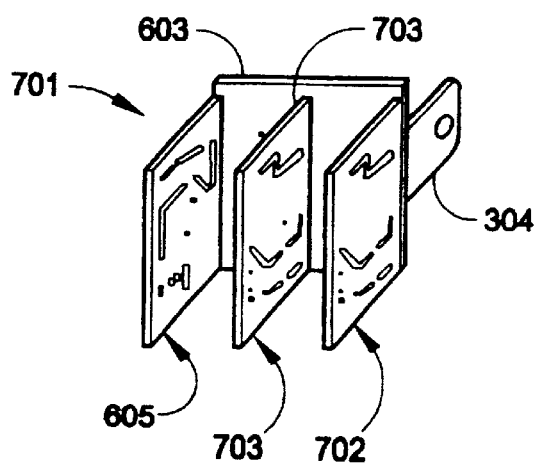

In use, it may be impossible to incorporate an acknowledgment pager transceiver in the master relay control unit 1. This may be due to a paging system 19 which does not accommodate two-way paging. For this reason, the present invention may be modified to transmit data from the vehicle 13 using cellular telephone communications. FIGS. 7(*a*) and 7(*b*) illustrate a modified GPS slave unit 701 which uses a 300 MHZ receiver 702 and a cellular telephone transmitter 703 instead of the transceiver 607 shown in FIGS. 6(*a*) and 6(*b*). Although FIGS. 7(*a*) and 7(*b*) illustrate the GPS slave unit 701, it should be understood that any of the slave units described herein can incorporate the cellular communication scheme. Other slave units may require additional processors such as processor 707, depending on the complexity of the operations it must monitor and/or perform. In FIGS. 7(a) and 7(b), the cellular telephone transmitter 703 enables the transmission of, for example, telemetry or GPS data. As those skilled in the art will appreciate, the cellular telephone transmitter can also be incorporated into the master relay control unit 1 in which case the slave unit uses a transceiver, and the master relay control unit has both a paging receiver 1a and the cellular telephone transmitter 703 connected to its controller 1b.

The modified GPS slave unit 701 receives GPS locator signals which are translated by the GPS processor 605. Alternatively, telemetry processors can be used. The receiver 702 receives commands from the master control unit 1 requesting GPS information or automatically generates the GPS information periodically, and forwards the GPS information to the master control unit 1 using the transceiver 607 or, via the cellular telephone transmitter 703, to a compatible receiving link at the paging system 19.

Figure 9A:
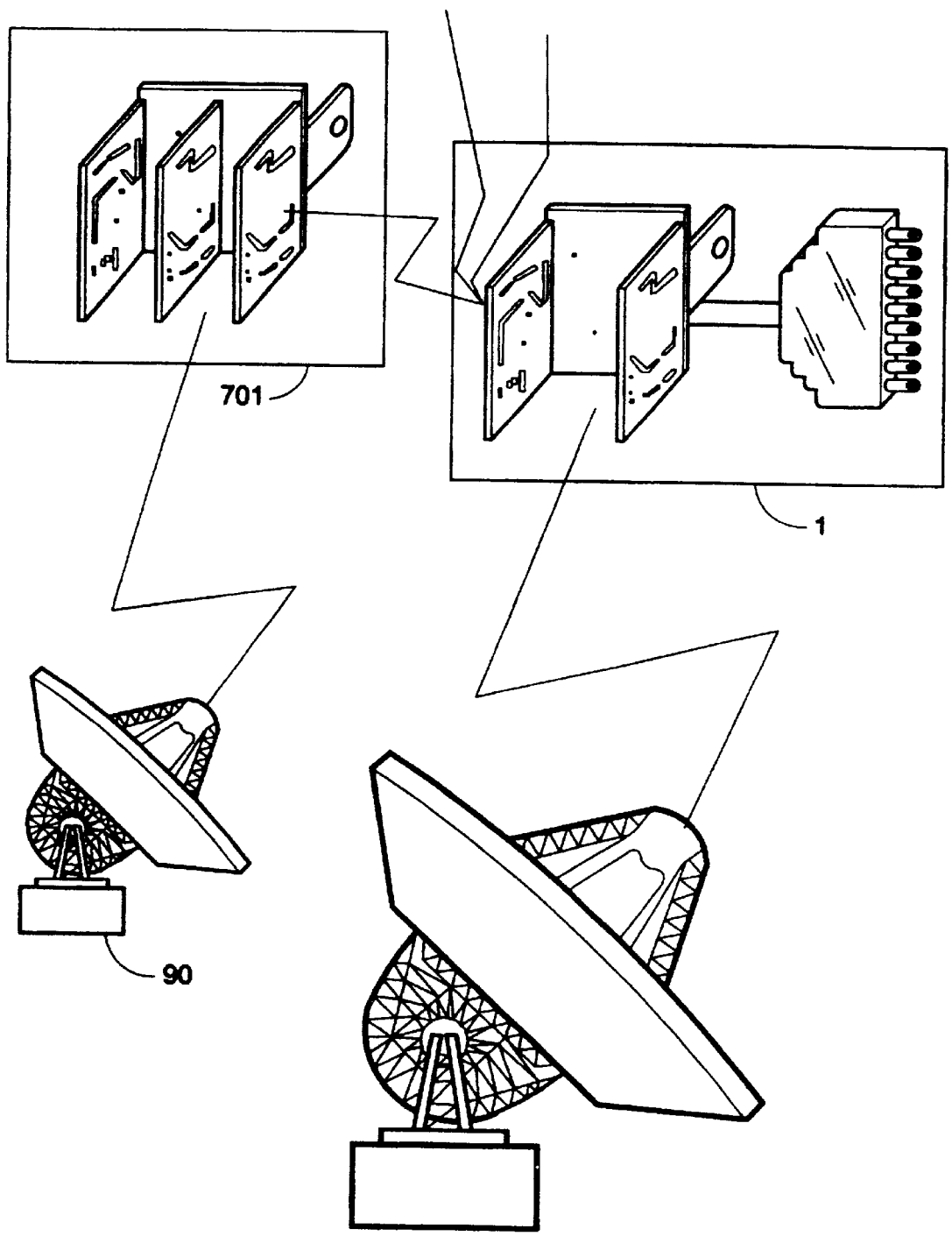
FIG. 9A illustrates the communication interface using a cellular phone link according to an embodiment of the present invention.

Referring to FIG. 9, a general overview of the cellular telephone reporting embodiment is shown. The master relay control unit 1 communicates with the main transmitting system 19 which is preferably a paging system. The master relay control unit transmits a command to the GPS slave unit 701 requesting location information, and the GPS slave unit 701 responds by transmitting the location information via its cellular phone transmitter to a predetermined telephone number through nationwide cellular telephone system 90. As an alternative to cellular telephone transmissions, other wireless telephone transmissions can also be used with the present invention.

As described herein, the present invention described herein can accommodate one-way or two-way communication depending upon the desires of the user. It is intended that two-way communication be based upon acknowledgment paging services and that one-way communication be based upon normal one-way paging. Alternatively, two-way communication can be established utilizing normal one-way paging in conjunction with a cellular telephone transmitter or standard telephone system as discussed above. This can be utilized where two-way acknowledgment paging is not available. Two-way communication provides that data can be obtained from the vehicle using the system and that confirmations can be made that a message or command has been received and processed.

A distinct encoded identifier is preferably used to identify the vehicle(s) to which a transmission from the paging system 19 is intended. The identifier may identify a single vehicle or a group of vehicles, such as by vehicle model. The slave units in the system have individual identifiers which the master relay control unit uses in its commands so that the correct slave unit will follow the command. Through the use of encoded digital signals, a secure and reliable system is provided which, through the use of a single main receiver/transceiver 1a, can operate a plurality of slave relays and other slave devices. Using transceivers, confirmation that a command was followed can be transmitted to the master relay control unit 1 for transmission back to the nationwide radio acknowledgment radio paging system 19 and ultimately to the subscribing customers. Alternatively, the cellular phone transmission embodiment described above could send back the information or confirmation.

Additional uses for the present invention include notifying the vehicle operator/owner of a manufacturer's or supplier's recall campaign and to transmit from the vehicle an encoded confirmation that the message was received. This application may utilize three of the system features described above including, with reference to FIG. 1:

Master Relay Control Unit 1
Dashboard Visual Display 2
Audible Message or Warning Unit 7

In this particular application, the digital receivers within the slave units such as display panel 2 and warning system 7 in FIG. 1 are in hardwired electrical communication with the relay(s) or processor(s) which activate the visual and/or audible message units in the vehicle. Specifically, the system includes visual and audible message delivery and display devices tied to digital radio transceivers 2a and 7a, which in turn are connected to controllers 2b and 7b that control the audible and/or visual warning units 2c and 7c. Using this system a signal can be transmitted over the nationwide radio paging system 19 to the receiver 1a of the master relay control unit 1. The signal designates the specific vehicle(s) to be recalled. The signal is interpreted by the controller 1b and, if it identifies the receiving vehicle by model or VIN number for example, then it is retransmitted through the digital radio transmitter 1c to the digital receivers/transceivers 2a and 7a. Once received by the receivers 2a and 7a, the system initiates the notification/warning by triggering the appropriate relay(s) or by selecting the appropriate warning to send to provide an audio and/or visual warning to the operator of the vehicle that a recall campaign has been initiated. The controllers 2b, 7b can repeat the audio and/or visual warning(s) over predetermined periods with predetermined intervals so that the operator will receive a plurality of warnings.

A simpler application of the present invention to vehicle recall campaigns can be achieved using the single purpose stand alone unit illustrated in FIGS. 2(b) and 2(c) or FIGS. 3(b) and 3(c). Here, the stand alone unit directly activates a visual or audible warning in the vehicle using special or existing cockpit mounted warning devices.

Acknowledgment paging (or the cellular telephone transmitter or standard phone system embodiments) for vehicle recall campaign notifications according to the present invention enables a vehicle or parts manufacturer to deliver recall information to owner/operators quickly, and also to receive a listing of all vehicles which confirmed the receipt of the recall message. The master relay control unit can also include a permanent memory which is written with an indication that the recall notice was received. In the event of a later dispute over whether such notice was received, the permanent memory can be accessed in order to prove that the vehicle had indeed received the recall notice. The confirmation messages transmitted from the vehicles may also be programmed to include an indication of whether the visual and/or audible alarm was activated in the vehicle.

Figure 10:
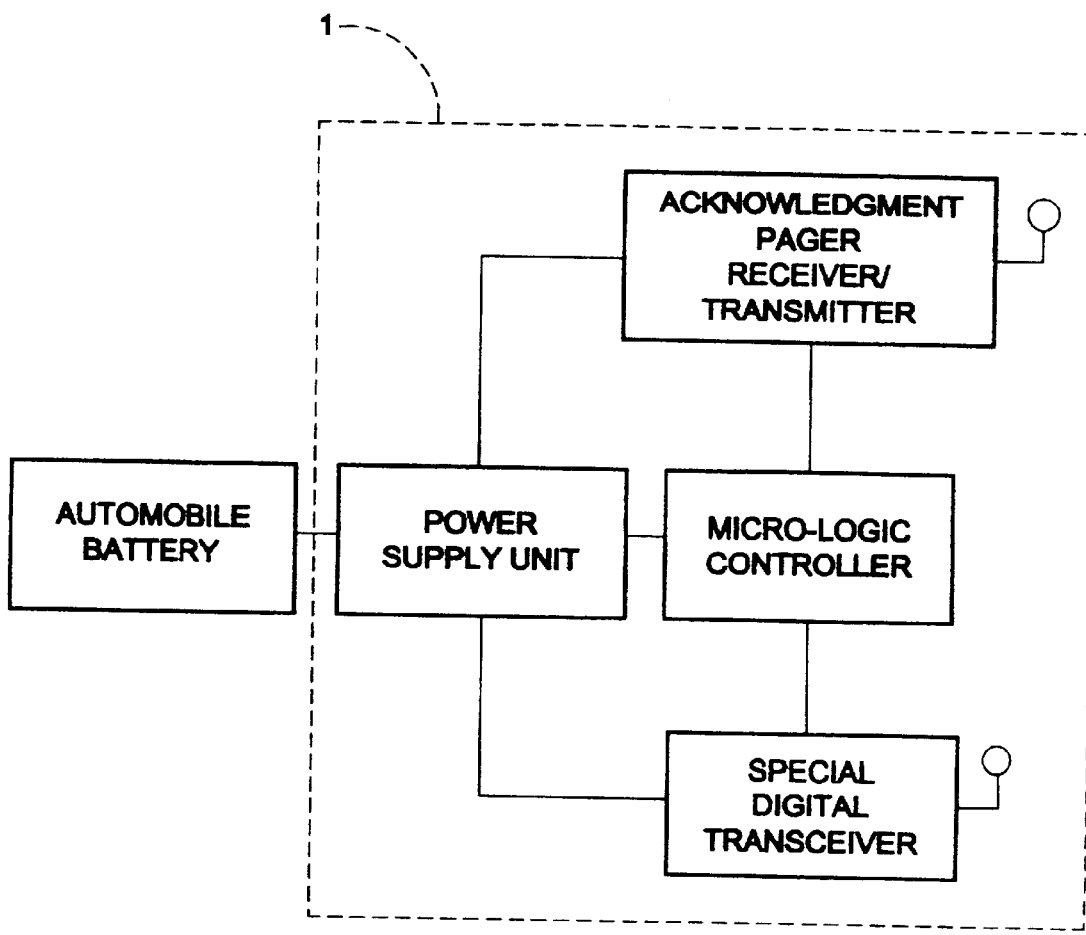
FIG. 10 is a block diagram of the internal components of a master relay control unit according to an embodiment of the present invention.

Referring to FIG. 10, the master relay control unit 1 obtains power from the vehicle battery. An auxiliary power source such as a backup battery 1001 can also be used, and can either be incorporated into the housing of the master relay control unit 1 or mounted nearby. The slave unit (not shown) also preferably obtains power from the vehicle's battery, although an auxiliary power source can be used in addition to, or instead of, the vehicle's battery. The auxiliary power sources can be batteries or capacitors or other types of power delivering devices. Power and common ground are obtained through the units' electrical power connectors 304, 304' if the three-prong plug is used. Although not shown, a power-conditioning circuit may be added in order to smooth out the voltage signal from the vehicle's power source. Automobile batteries, for example, sometime deliver inconsistent voltages making such power-conditioning circuits advantageous.

As those skilled in the art will appreciate, using the foregoing combination of components, a system can be easily installed within an automobile or other vehicle by simply replacing stock relays with specialized relays as described above. In this manner, the entire system is a wireless type system and does not require the direct electrical connection of the main receiver with the particular components through the automobile. As those skilled in the art will appreciate, this will result in a much more cost effective product in terms of component costs and installation.

Using the Described Inventions in Equipment Other Than Vehicles

The present invention as described above can be adapted for use with equipment other than vehicles. Referring initially to FIG. 11, the system of the present invention includes a main transmitter system 20 that is at a fixed location. A customer database and message/command processing center 18 can control the communications between the subscribing customers and equipment to be accessed, monitored or controlled. The processing center 18 can interface with a nationwide paging dispatch center 19 (and thus the transmitter system 20 of which it is a part) that can provide the actual communication link. Thus, while the present disclosure refers to a single main transmitter, those skilled in the art will appreciate that the use of a typical paging system requires the use of a plurality of transmitters to cover the desired territory because each transmitter has a limited coverage area. In operation, each individual transmitter transmits substantially simultaneously to provide the overall desired territorial coverage.

The transmitter system 20 is able to transmit a digital signal over a radio frequency to a main receiver 1 (see FIGS. 15a to 15h) which is maintained on board the equipment and which is a part of the Master Relay Control Unit. Preferably, the main transmitter 20 and the main receiver 1 are pager-type transmitters and receivers such that the radio signal is simultaneously transmitted from a plurality of pager transmitters throughout the territory where the equipment may be located. In this manner, regardless of the location of the equipment, the transmitted signal can be received by the main receiver 1 on board the equipment. Preferably, both the transmitter and receiver are digital type radio equipment to allow the use of encoded digital signals. In this manner the security and reliability of the system can be maximized.

Additionally, a controller 1a is installed in the equipment. It is preferred that this controller 1a is a micrologic controller that can interpret the coded message received by the main receiver 1. The controller is in electrical communication with the main receiver or transceiver 1. Also connected to the main receiver or transceiver 1 and the controller 1a is a digital radio receiver or transceiver 1b that is capable of receiving and/or transmitting a series of predetermined digital codes. This digital radio receiver and/or transceiver 1b is capable of transmitting and receiving digital codes to a plurality of digital receivers and/or transceivers installed in the equipment.

A distinct encoded signal is used for each relay or system to be accessed, monitored or controlled. By sending one or more encoded signals, operation of one or more systems can be accessed, monitored or controlled. Through the use of encoded digital signals, a secure and reliable system is provided which, through the use of a single acknowledgment main receiver/transmitter, can operate a plurality of relays and thus function of the equipment. Using transceivers, confirmations (that a command was activated), information or data can be transmitted to the main acknowledgment pager receiver/transmitter 1b for transmission back to the nationwide radio acknowledgment radio paging system. Additionally, a single digital receiver can be connected to a plurality of relays and can control a particular relay by interpreting the digital signal it receives from the main receiver/controller and operating the appropriate relay.

The individual digital receivers incorporated in any one application are in electrical communication with a particular and predetermined electrical relay or relays or devices. The relays or devices include, without limitation, equipment mounted visual displays and warning devices, power controls (equipment on/off switching), equipment telemetry and operation monitors, equipment monitors and controls (unit, capacity and/or volume), ignition/key switch and/or starters for combustion or turbine powered equipment, audible alarm controllers, equipment access doors/locks, GPS receiver and processor, various telemetry data regarding equipment operation and use and any other relay based or controllable function of the equipment.

As those skilled in the art will appreciate, this system allows for remote accessing, monitoring and controlling of a variety of equipment in a variety of fields including, but not limited to manufacturing, production and processing, assembly, shipping and delivery, transportation, office and copy equipment, construction, earth moving and agricultural.

The system is flexible and because of its unique nature specific applications can be implemented to meet each individual customer's needs. Often this can be accomplished simply through programming the individual components of the system prior to or after their installation or delivery.

The system can include message delivery and display devices such as a digital radio receiver that is connected to a timer control that controls an audio warning unit. Using this system, a signal can be transmitted over the nationwide radio paging to the main receiver that is interpreted by the controller and retransmitted through the digital radio transmitter to individual digital transceivers. When a command message is received, the system can initiate an audible warning to the users of the equipment prior to enabling or disabling a particular function of the equipment or any other desired or designated message or signal. For example, prior to disabling the starter or power supply mechanism in a piece of equipment, the warning device can provide an audio warning to the user of the equipment that the starter or power supply mechanism of the equipment will be disabled unless the operators perform certain actions (e.g. required maintenance). Preferably, the timer control will proved that the audio warning is repeated over a predetermined period with predetermined intervals so that the operators will receive a plurality of prior warnings of the enablement or disablement of certain functions of the equipment.

Figures 3A, 3B:
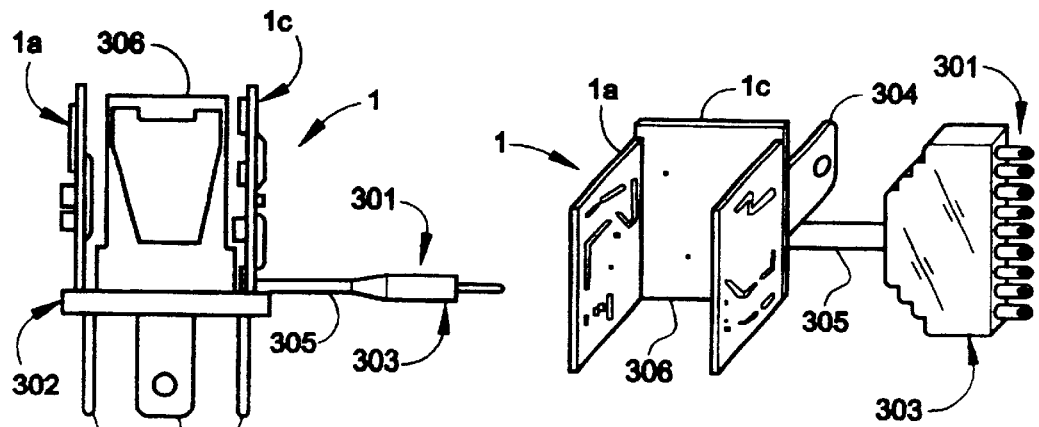
FIGS. 3(a) through 3(d) show the assembly of the master relay control unit according to different embodiments of the present invention.
Figures 3C, 3D:
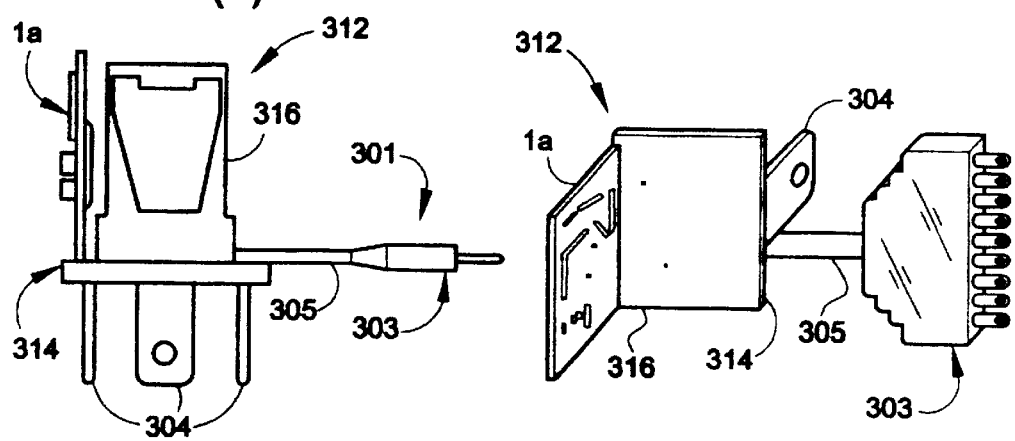

In the one embodiment shown in FIGS. 3(a) and 3(b), the main receiver and the digital radio transmitter are installed on a single relay platform. Preferably, the transmitter is a 300 MHZ transmitter that has sufficient range to be in radio communication with digital radio receivers placed within the equipment. Alternatively, as shown in FIGS. 3(c) and 3(d), the present system can function through the use of a standalone pager-type main receiver installed on a particular relay platform which operates a particular vehicle function or system feature, for example, the starter motor. In this configuration, the standalone main receiver receives the signal from the nationwide radio paging system and directly operates the relay on the relay platform to which the main receiver is mounted.

Figures 3E, 3F:
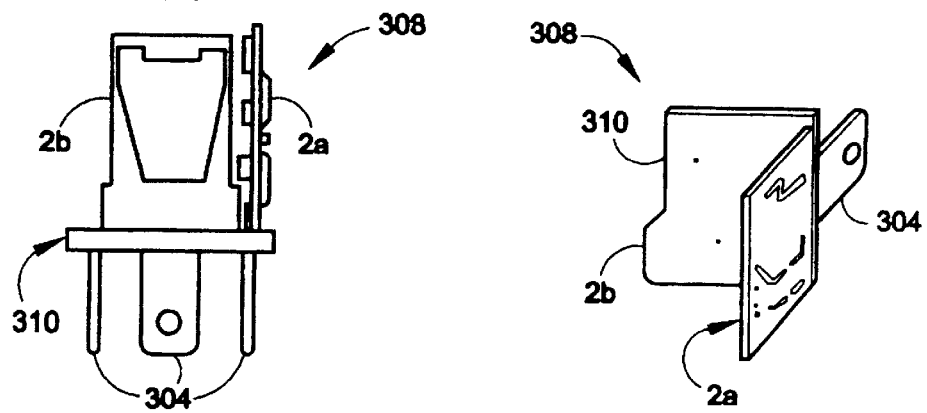
FIG. 3(e) and 3(f) show the assembly of a slave unit according to an embodiment of the present invention.

Similarly, as shown in FIGS. 3(e) and 3(f), digital radio receivers may be incorporated in a relay slave unit and both the relay and the 300 MHZ receiver are preferably mounted on a single relay platform which operates a particular equipment function, feature or accessory.

The relay platform based devices above may also incorporate the use of a wiring harness. See FIGS. 3(a) to 3(d), and FIGS. 4(a) to 4(d). This harness can be used to hard wire equipment functions to the main receiver or standalone receiver if this is more effective or the equipment does not contain the necessary pre-installed relays that would otherwise be replaced as discussed above. Alternatively, for manufacturing efficiency, it may be more cost effective to manufacture a single receiver/transceiver/relay unit that is useable in a variety of equipment types and for a variety of functions and features. As those skilled in the art will appreciate, the transmitter, receiver and transceiver devices herein disclosed could utilize a standard plug-type relay platform, a relay platform with a wiring harness interface or a plugless relay with the wiring harness interface.

Using the foregoing combination of components, a system can be easily installed within common equipment by simply replacing stock relays with specialized relays as described above. In this manner, the entire system is a wireless type system and does not require the direct electrical connection of the main receiver with the particular components through the equipment. This results in a much more cost-effective product in terms of component costs and installation.

While the system uses primarily existing relays to control equipment systems, additional relays may be installed to control non-relay based systems, to provide redundancy or to reduce system tampering or system disablement.

Referring now to FIGS. 4(a) to 4(d), an alternative embodiment of the present system is shown. FIGS. 4(a) to 4(d) contain acknowledgment pager transceiver. In this embodiment, an acknowledgment pager system can be used not only to send instructions to the equipment, but also to confirm receipt of the instruction and/or to retrieve information from the equipment.

Figures 4A, 4B:
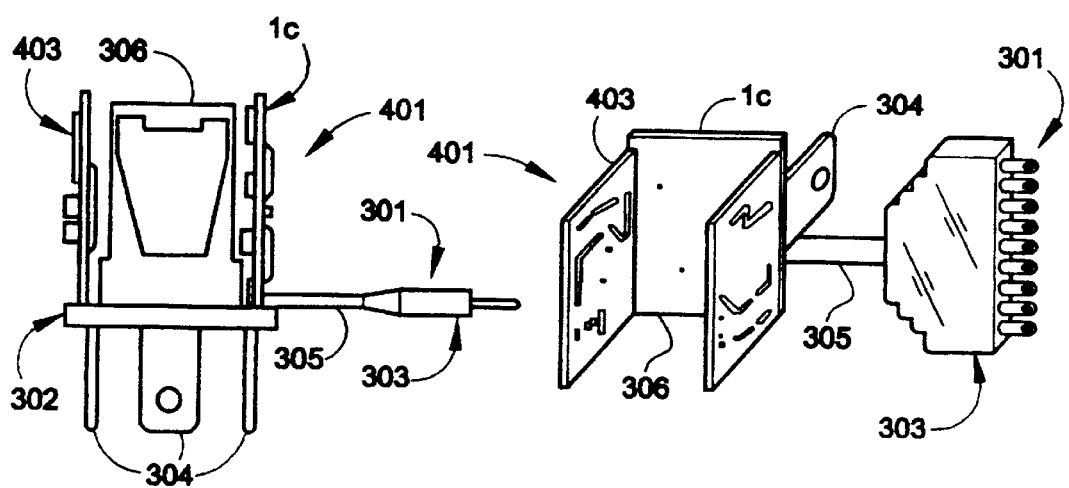
FIGS. 4(a) through 4(d) show the assembly of the master relay control unit according to further embodiments of the present invention.
Figures 4C, 4D:
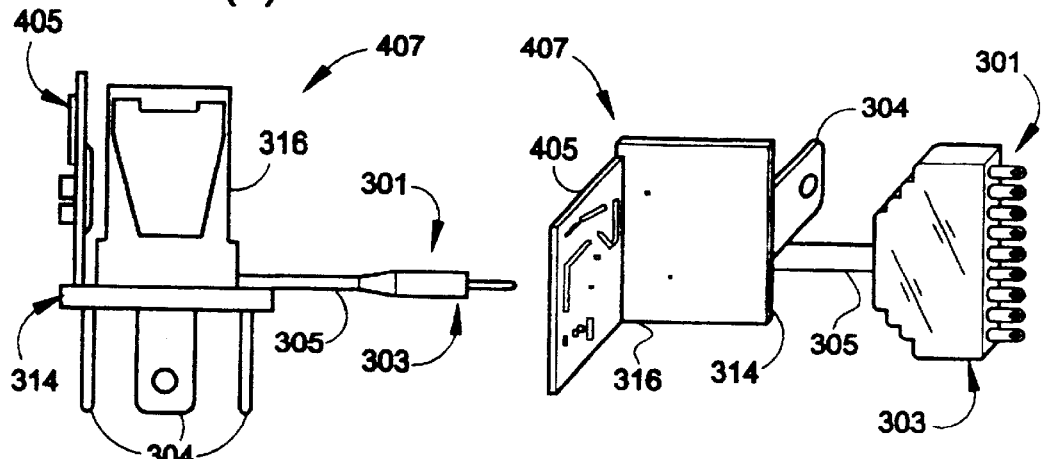
Figures 4E, 4F:
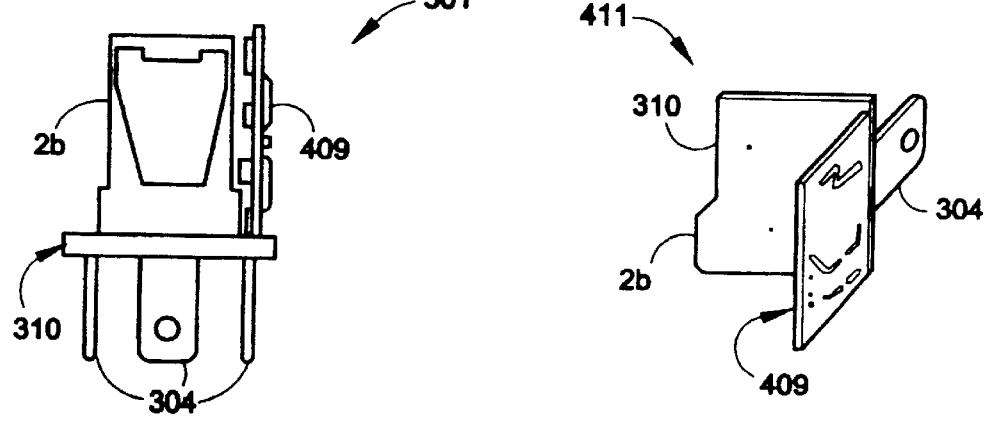
FIGS. 4(e) and 4(f) show the assembly of a slave unit according to a further embodiment of the present invention.

Referring now to FIGS. 4(e) and 4(f), an alternative embodiment of the present system is shown. In this embodiment, a 300 MHZ transceiver is included on the slave unit to transmit receipt confirmations or other information to the. Master Relay Control Unit for processing or for retransmission to the acknowledgment pager system or other recipient.

Figure 5A:
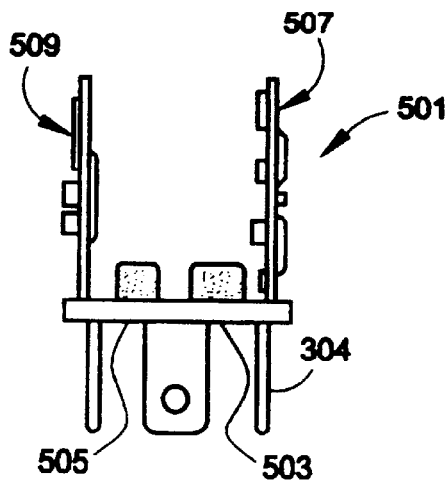
FIGS. 5(a) and 5(b) show the assembly of a slave unit according to yet another embodiment of the present invention.
Figure 5B:
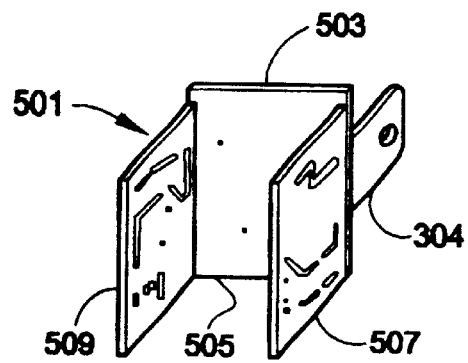

FIGS. 5(a) and 5(b) provide an embodiment of the system which incorporates a processor unit. This unit contains a logic board and processors that can be programmed to perform designated functions. These functions include accessing, monitoring or controlling designated vehicle functions or on-board processors such as engines, systems or performance monitoring devices and sensors, whether installed by the manufacturer or added later. The logic board and processors preferably communicate with the Master Relay Control Unit through a 300 MHZ transceiver contained in the relay based unit or the slave unit using digitized encoded messages. This encoded and digitized data can then be transmitted by the Master Relay Control Unit to the Nationwide Radio Paging System and the Customer Database and Message/Command Processing Center and subscribing customers.

FIGS. 5(c) and 5(d) illustrate another embodiment incorporating a GPS receiver, processor and logic board that is used to determine the geographical location of the unit, and thus the equipment. This data is processed and converted to a digitized signal that is transmitted to the Master Relay Control Unit through the 300 MHZ transceiver contained in the relay or slave unit. As noted above with processor unit, this encoded and digitized data can also then be transmitted by the Master Relay Control Unit to the Nationwide Radio Paging System and the Customer Database and Message/Command Processing Center and subscribing customers.

In systems that do not incorporate an acknowledgment pager transceiver in the Master Relay Control Unit, data can be transmitted from the equipment utilizing cellular or standard telephone communications. FIGS. 5(e) and 5(f) illustrate the use of a cellular telephone transmitter. In FIGS. 5(e) and 5(f), a cellular telephone transmitter is incorporated to enable the transmission of, for example, telemetry or GPS data. As those skilled in the art will appreciate, the cellular transmitter or standard telephone can also be incorporated into the Master Relay Control Unit.

The system described herein can be based for either one-way or two-way communication depending upon the desires of the customer. It is intended that two-way communication be based upon acknowledgment paging services and that one-way communication be based upon normal one-way paging. Alternatively, two-way communication can be established utilizing normal one-way paging in conjunction with a cellular telephone transmitter or standard telephone systems as discussed above. This can be utilized where two-way acknowledgment paging is not available. Two-way communication provides that data can be obtained from the equipment using the system and that confirmation can also be made that a message or command has been received and processed.

In operation, the present system can be utilized for a number of purposes. For example, the present system can be utilized by a lending institution to ensure that the borrower keeps current on his payments to the lending company. If the borrower is delinquent in his payments, the lender can, through the authorization of a transmission of the appropriate signal, initiate the warning sequence to the equipment. If the borrower does not take the necessary actions, the lender can then authorize that a signal be transmitted to disable the power supply in the equipment. If the borrower does not take the necessary actions, the lender can then authorize that a signal be transmitted to disable the power supply in the equipment. In this manner, while the equipment itself may immediately be disabled, the equipment can alternatively be prevented from restarting after the power has been turned off. Once the account is brought current, the system can be used to re-enable the power to the equipment. Using acknowledgment paging enables the lender to confirm that their warning messages sent to the equipment were received and displayed or the audible alert was given.

Other benefits and features of this system are disclosed in FIGS. 8, 12–14, 15(a), 15(h), and 16. FIG. 16 illustrates the interaction and function of the system using one-way paging technology and FIG. 8 illustrates the interaction and function of the system using two-way paging technology.

FIG. 12 presents the installation of the system in a copy machine. For example, using this system, the use of the copy machine can be controlled by reference to a copy counter. This enables the copy machine to be authorized for a pre-designated number of copies that can be made. When the authorized number of copies is being reached, a warning is displayed to the user. The user can then contact the rental or leasing company and arrange for the payment for additional copies. At the time this authorization is transmitted, the acknowledgment pager unit would then transmit for the rental or leasing company the current telemetry indicating the current cumulative copies made on the machine.

FIGS. 5(a) to 5(h) display the underlying functions of the system as it can be installed in a copy machine as discussed and illustrated in FIG. 12. FIGS. 5(a) to 5(d) show the system using one-way paging and FIGS. 5(e) to 5(h) show the system using two-way acknowledgment paging.

FIG. 13 sets forth a typical installation of the system in a piece of heavy equipment. In this example the system can, for example, be used for the following functions:

Control of the starter mechanism to enable and disable the ability to use the equipment;

On-board monitoring of equipment function utilizing equipment telemetry to monitor use and function;

GPS receiver and processor allows the equipment to be remotely located;

Remote transmission to provide on-board audible alerts and notifications to operator;

Remote transmission to provide on-board visual alerts and notification to operator.

In operation, the present invention can also be used to notify the equipment operator/owner of a manufacturer's or supplier's recall campaign and to transmit encoded confirmation of the receipt of the message. This application could utilize three of the system features described above. These could include, referring to FIGS. 15(e) to 15(h), the following components:

Master Relay Control Unit (1, 1a, 1b)

Visual Display (2b)

Audible Message or Warning Unit (2c)

In this particular application, a distinct encoded signal is used for each relay in the equipment notification system. By sending one or more encoded signals, operation of one or more notification systems can be controlled. Through the use of encoded digital signals, a secure and reliable system is provided which, through the use of a single main receiver/transmitter, can operate a plurality of relays or devices and thus particular notification functions in the equipment. Using transceivers, confirmation that a command was activated can be transmitted within the system to the main acknowledgment pager receiver/transmitter for transmission back to the nationwide radio acknowledgment radio paging system and ultimately the subscribing customer. Alternatively, the cellular phone transmission embodiment described above or standard phone systems could send back the information or confirmation.

In the recall/notification application, the digital receivers are in electrical communication with the relays or processors which activate the visual and audible message units in the equipment. Specifically, the system includes visual and audible message delivery and display devices tied to a digital radio transceiver 2, that in turn is connected to timer control 2a, that control both an audio and a visual warning unit 2b and 2c. Using this system, a signal can be transmitted over the nationwide radio paging to the main receiver 1, that is interpreted by the controller 1a, and retransmitted through the digital radio transmitter 1b, to the digital transceivers 2. Once received by the transceiver 2, the system initiates the notification/warning by triggering the appropriate relay(s) to provide an audio and/or visual warning to the operator of the equipment that a recall campaign has been initiated or any other desired message. The timer control can be used to provide that the audio and/or visual warning(s) is/are repeated over a pre-determined period with predetermined intervals so that the operator will receive a plurality of warnings.

A simpler application for use in the equipment recall campaigns can be achieved using the single purpose standalone unit illustrated in FIGS. 2b and 2e which could be used to activate a visual or audible signal in the equipment using special or existing control console devices.

By using acknowledgment paging (or the cell phone transmitter or standard phone systems) for equipment recall campaign notification, enables the manufacturer to not only get the recall information to the owner/operator, but also to receive a listing of all equipment which confirmed the receipt of the recall message and even whether the visual and/or audible alert has been displayed or activated in the equipment.

In short, the application of the described inventions to general equipment environments includes an apparatus and method designed for use with equipment that remotely activates various devices, visual displays and audible messages installed in various types of equipment. The apparatus installed in equipment includes a special pager receiver or acknowledgment pager receiver/transmitter that decodes paging messages sent from a paging transmitter site. The pager receiver or acknowledgment pager receiver/transmitter is electrically connected to a micro-logic controller that interprets the coded message received by the pager receiver or transceiver. Also included and connected to the pager receiver or transceiver is a special digital radio transmitter or transceiver that is capable of transmitting a series of predetermined digital codes and receiving digitized information to receivers or transceivers operating on that frequency in the equipment.

A digital receiver or transceiver is incorporated in a package that includes an electrical connection to an electromagnetic relay or device that is of the design commonly found in equipment applications. The electromagnetic relay or device is plugged into the electrical circuits of the equipment that activate certain devices or functions most commonly using electrical relays or other devices. The digital transmitter or transceiver sends the coded wireless message to the digital receiver or transceiver and the electromagnetic device will open if closed and close if open or activate an electrical device. Where transceivers are used, a confirming message can then be transmitted back to the main acknowledgment pager receiver/transmitter in the equipment.

The method of operation includes activating a remote warning sounder or visual display first and, if required, disabling the ability to start the equipment. This system provides an equipment finance credit company with a method of collection enforcement. If a loan customer is late in making a scheduled payment and does not bring the account current, the equipment finance company can send a data message using a dedicated high speed line, or dial-up telephone circuits, to the customer database and message/command processing center. The command is processed through a nationwide paging dispatch center that in turn broadcasts a signal through a nationwide radio paging or acknowledgment paging system.

The main receiver or acknowledgment transceiver installed in the equipment receives the transmitted encoded message. The micro-logic controller decodes the message received and activates the digital transmitter or transceiver in the equipment. This installed transmitter or transceiver then transmits a specific coded signal that corresponds to a specific digital transceiver located in the equipment. The main acknowledgment receiver or transceiver and/or standalone receiver or transceiver located in the system also contains wiring harnesses that can be used to wire the receiver or transceiver directly to relays or devices in the equipment. When the digital receiver or transceiver hears that specific code, it opens or closes the electromagnetic relay that is connected to specific electrical circuits that can disable and enable certain functions of the equipment or activates an electrical device. Again, confirmation of the receipt and processing of the signal is then transmitted back to the nationwide radio acknowledgment paging system.

The apparatus installed in equipment includes a special pager receiver or acknowledgment pager receiver/transmitter that decodes paging messages sent from a paging transmitter site. This provides a method and apparatus for communicating with specific electrical and mechanical components in order to access, monitor, disable and enable certain functions of a piece of equipment, system features and equipment accessories.

The pager receiver or acknowledgment pager receiver/transmitter is electrically connected to a micro-logic controller that interprets the coded message received by the pager receiver or transceiver. Also included and connected to the pager receiver or transceiver is a digital radio receiver or transceiver that is capable of transmitting a series of predetermined digital codes and receiving digitized information from transceivers operating on that frequency within the equipment.

Several types of receivers are incorporated in the system. One example is a digital receiver incorporated in a package that includes an electrical connection to an electromagnetic relay that is of the design commonly found in equipment applications. The electromagnetic relay is plugged into the electrical circuits of the equipment that activate certain devices or functions that commonly use this type of electrical relay. The digital transmitter sends the coded wireless message to the digital receiver and the electromagnetic device will open if closed and close if open.

Two way communication is also provided in the system using a cellular telephone transmitter. This transmitter can be used to transmit messages from the equipment where two-way acknowledgment paging is not available or not desirable.

The apparatus and system can be used in a piece of equipment to remotely activate an audio and visual warning device to notify the operator/owner that a manufacturer's or supplier's recall campaign has been initiated for that specific piece of equipment.

A digital receiver or transceiver is incorporated in a package that includes audio and visual warning devices. The digital transmitter or transceiver sends the coded wireless message to the digital receiver or transceiver and the electromagnetic device activates the warning or notification devices. Where acknowledgment paging is being used, the system can then transmit a message to the Message Control Center that the warning or notification has been activated. This confirmation can be processed and forwarded to the subscribing customer.

If a manufacturer or supplier initiates a recall campaign, they can send a data message using a dedicated high speed line, or dial-up telephone circuits, to the customer database and message/command processing center. The command, designating the specific equipment to be recalled, is processed through a nationwide paging dispatch center that in turn broadcasts a signal through a nationwide radio paging or acknowledgment paging system that can be processed and the resulting data provided to the manufacturer.

Plug Adapter Device Usable with the Various Described Embodiments

Referring initially to FIG. 17, the plug adaptor of the present invention is shown and generally designated 10. The plug adaptor includes a plug portion 12 attached to a lead portion 14. Additionally, a recess 16 is provided.

Plug portion 12 is sized and shaped to fit into a standard pin receptacle of a relay or other device. As those skilled in the art will appreciate after reviewing the present disclosure, the thickness 18 of the plug portion will be slightly thicker than the standard thickness of the applicable relay pin. The width 19 will preferably be substantially the same as the width of the pin of the relay. Given the flexibility of the contacts in the relay pin receptacle, the plug adaptor will fit into the pin receptacle. At least a portion of the outer surface of plug portion 12 is covered with a conductive material 20.

At least a portion of the inner surface of recess 16 is covered with a conductive material 22. Lead portion 14 of plug adaptor 10 includes a first conducting surface 24 and a second conducting surface 26 which are separated by an insulator 28. In the particular configuration shown in FIG. 17, first conducting surface 24 is in electrical communication with recess conductive material 22. Similarly, second conducting surface 26 is in electrical communication with plug conductive material 20. As will be discussed in further detail below, the above described configuration provides a break in the electrical connection between a particular relay pin and its corresponding receptacle.

Referring now to FIG. 18, a wire connector 30 is shown installed on lead portion 14 of plug adaptor 10. As those skilled in the art will appreciate, wire connector 30 includes a recess (not shown) having two electrically conducting contact surfaces (not shown) which are positioned to come into contact with and provide electrical communication with first and second conducting surfaces 22, 24 of lead portion 14 of the plug adaptor. Wire connector 30 includes a first lead 32 and a second lead 34 which can be connected to a secondary relay or other circuit control device (not shown). First lead 32 is connected to one of the two contact surfaces of wire connector 30. Second lead 34 is connected to the other contact surface of wire connector 30. In this manner, the recess conductive material 22 is in electrical communication with first conducting surface 24 of lead portion 14 of plug adaptor 10. The first conducting surface 24 is in electrical communication with the second contact surface of wire connector 30 which in turn is in electrical communication with first lead 32. Similarly, plug conductive material 20 is in electrical communication with second conducting surface 26 which in turn is in electrical communication with the second contact surface of wire connector 30 which in turn is in electrical communication with second lead 34. As those skilled in the art will appreciate, a means is provided by which the contact between a relay pin inserted into recess 16 and a standard relay pin receptacle in contact with plug portion 12 can be interrupted.

As those skilled in the art will appreciate, the particular configuration of the lead portion and the plug portion can be configured to provide appropriate contact with both the relay pin and the relay receptacle without interfering with adjacent components etc.

Referring now to FIGS. 19(a) to 19(e), the installation operation of the present plug adaptor is discussed. Referring specifically to FIG. 19(a), an original electric relay 40 is shown. Relay 40 is connected to relay base 42. Connected to relay base 42 is relay pin 44. As those skilled in the art will appreciate, in order to provide for appropriate clearances for insertion into the existing relay pin receptacle, the overall dimensions of the plug portion of the plug adaptor must be controlled. Accordingly, in the preferred embodiment, the first step in installing the adaptor plug 10 is to trim the pin portion 44 of the original relay 40. The width 46 of the relay pin is reduced. The trimmed relay pin 48 is shown in FIG. 19(b). Once the relay pin 48 has been trimmed, the plug adaptor 10 is installed over the pin 48 as is shown in FIG. 19(c). As those skilled in the art will appreciate, because the plug portion 12 of the adaptor 10 is approximately the same size as the original relay pin 44, it can be inserted into the relay pin receptacle during installation of the relay 40.

Referring now to FIG. 19(d), a wire connector 30 is installed onto lead portion 14 of plug adaptor 10. Wire connector 30 includes a first lead 32 and a second lead 34 which can be connected to an additional relay or other circuit control device. An example of an alternative control device 48 is shown connected to wire connector 30 in FIG. 19(e).

As those skilled in the art will appreciate, by connecting a secondary or alternate circuit control device 48 to the plug adaptor of the present invention, a secondary means by which the circuit can be broken is provided. In this manner, both the original relay and the alternate circuit control device must be in a closed circuit configuration in order for the circuit to be completed. In an alternative embodiment, use of two plug adaptors on the two circuit pins of a relay combined with a common alternate circuit control device which can bridge the two relay pins, provides not only a secondary open circuit configuration, but also an alternative closed circuit mode. In this manner, the circuit could be closed based on input from the original relay or the alternate circuit control device.

In short, using the plug adapter of the present invention can be consider to encompass an apparatus and method designed for providing access to electrical and electronic circuits by simply modifying an original plug and installing a plug adaptor device is provided. This present invention provides a new method of interrupting or gaining access to an electrical or electronic circuit.

One application is to allow the modification of an electronic circuit in automotive applications. Many electrical and electronic functions of an automobile utilize electronic relays. These relays are typically used to activate a high amperage electrical source line by sending a low amperage signal to the relay. These relays are normally plugged into receptacles in the automobile and once installed complete a portion of designated circuitry. The present plug adaptor device invention allows the low amperage signal line to be interrupted in order to modify the original circuit and add a new signal or control component. Thus the original system can be modified or altered without physically changing the original circuitry.

Pin Adapter Usable with the Various Described Embodiments

An inventive pin adapter according to the present invention provides a method and apparatus for accessing an electrical circuit at an existing relay or other device to further control the particular circuit.

Referring initially to FIG. 20, the pin adaptor of the present invention is shown and generally designated 10. The pin adaptor includes a thin strip of conductive material 14 which is connected to a segment of nonconductive shielding material 18. Conductive material 14 includes a pin portion 12 which is intended to be inserted into an electrical socket such as a socket for receiving a relay or other component. Conductive material 14 is in electrical communication with wire lead 16. Preferably, conductive material 14 is bent at approximately a 90 degree angle to avoid interference between pin adaptor 10 and the relay or other electrical component with which it is intended to be used. While conductive material 14 may be made out of common electrically conducting materials like metals, it is preferably made out of a conductive Mylar or similar material. In this manner, the thickness of the material can be minimized without sacrificing strength for the structural integrity of the pin adaptor itself. Wire lead 16 can be connected to additional electrical components and circuits to provide the necessary control or monitoring.

Referring now to FIGS. 21(a) to 21(f), the installation and operation of the pin adaptor 10 can be seen and understood. Referring initially to FIG. 21(a), an electronic relay 40 is shown. Relay 40 includes a relay base and is shown connected to a relay socket 44. Referring now to FIG. 21(b), relay pins 46 can be seen in the cutaway view of the relay socket 44. The pin adaptor of the present invention is designed to be utilized with relay connections similar to those shown in FIGS. 21(a) and 21(b) and any other electronic pin/plug connection where access control or monitoring of the particular circuit is desired.

The installation of the pin adaptor 10 can best be seen by FIGS. 21(c) to 21(e). Referring to FIG. 21(c), the relay 40 is shown removed from relay socket 44. As can be seen from the drawing, relay pins 46 have been removed from their receiving sockets. As those skilled in the art will appreciate, the relay or other electrical component needs to be removed from its particular socket for the present pin adaptor to be utilized in its preferred embodiment. Accordingly, to utilize the pin adaptor, the first step is to remove the relay or other pin including electric component from its particular socket.

The second step of using the pin adaptor 10 of the present invention is to insert the pin portion 12 of the pin adaptor 10 into the socket 44 at which the circuit is to be accessed or controlled. As those skilled in the art will appreciate, because of the thinness of the pin portion 12 of the pin adaptor, sufficient clearance remains in the relay socket 44 to allow the relay or other pin 46 to be inserted into the socket notwithstanding the previous insertion of the pin portion 12 of the pin adaptor 10 into the socket. Accordingly, the next step is to reinsert the pin or pins 46 of the relay or other electrical component into the socket 44. Because the pin portion 12 of the pin adaptor is in electrical communication with the pin of the relay 46 (or other device) and the socket for the relay pin 46 (or other device pin), access to the circuit via wire adaptor 10 and wire lead 16 accomplished.

Referring now to FIG. 21(f), the pin adaptor is shown connecting the electric circuit of one pin of relay 40 to an additional electrical component 50. Electrical component 50 could be a voltage monitoring device, alternate relay, or other electrical component which requires access to the circuit or which provides monitoring or control of the circuit. As those skilled in the art will appreciate, the pin adaptor of the present invention allows access to a circuit at a pin and socket connection without interference with the circuit or electrical components themselves. In this manner, access to the circuit can be temporary if desired. This may allow particular advantages during testing or analysis of electronic components of a complicated system. Moreover, the structural rigidity of the particular pin adaptor allows for long term placement of the device as well. This long term placement may be more advantageous for situations where long term control monitoring or access is necessary.

In short, the pin adapter according to the present invention provides an apparatus and method designed for providing access to electrical and electronic circuits at the interface between a pin and socket connection is provided. The present invention allows access to the circuit without interference or modification of either the plug or socket itself. This is accomplished through the use of an extremely thin conductive material which is placed into a socket such that it is in electrical communication with both the socket and the pin once the pin is reinserted into the socket. This thin conductive material is connected to a lead which can then be connection to other electrical components. One application for the present device may be to provide a second control input to a particular relay.

The invention having been thus described, it will be obvious that the same may be varied in many ways not only in construction but also in application. For example, the switches used in the present invention can be temporary on/off devices such as relays, or permanent on/off devices such as fuses. Such variations are not to be regarded as a departure from the spirit and scope of the invention, but rather as modifications intended to be encompassed within the scope of the following claims.

What is claimed is:

1. An apparatus for providing two-way communication between a vehicle and a remote communication station, said apparatus comprising:
    a transceiver, mounted in the vehicle, for receiving an incoming signal from a communication station and transmitting an outgoing signal to the communication station;
    a first controller, mounted in the vehicle, the first controller being connected to said transceiver, for determining whether said incoming signal includes a predetermined signal and, if so, for instructing a transmission of a command;
    a wireless transmitter, mounted in the vehicle, the wireless transmitter being connected to said first controller, for transmitting the command; and
    at least one slave unit, mounted in the vehicle, said slave unit including:
        a first receiver for receiving said command transmitted by said wireless transmitter, and
        a second controller, connected to said first receiver, for controlling a function of the vehicle in response to said command;
    the apparatus further comprising:
        a second receiver for receiving wireless communications, said second receiver being connected to said first controller, and further wherein said slave unit includes a second wireless transmitter for transmitting a message to said second receiver.

2. The apparatus according to claim 1, said second controller further including an input for receiving information from an in-vehicle data processor, wherein said command is for monitoring the vehicle function and, in response to said command, said second controller causes said second wireless transmitter to transmit, to said second wireless receiver, data based upon the information received on said input.

3. The apparatus according to claim 1, wherein said second wireless transmitter transmits said message to said second receiver in response to receipt of said command by said first receiver.

4. An apparatus for providing two-way communication between a vehicle and a remote communication station, said apparatus comprising:
    a first receiver for receiving an incoming signal from a communication station;
    a first controller, mounted in the vehicle, the first controller being connected to said first receiver, for determining whether said incoming signal includes a predetermined signal and, if so, for instructing a transmission of a command;
    a first wireless transceiver, mounted in the vehicle, the first wireless transceiver being connected to said first controller, for transmitting said command and for receiving a message; and
    at least one slave unit, mounted in the vehicle, said slave unit including:
        a second wireless transceiver for receiving said command transmitted by said first wireless transceiver and for transmitting said message, and
        a second controller, connected to said second wireless transceiver, for controlling a function of the vehicle in response to said command.

5. The apparatus according to claim 4, further comprising a transmitter, connected to said first controller, for transmitting outgoing signals to the communication station.

6. The apparatus according to claim 4, wherein said second wireless transceiver transmits said message to said first wireless transceiver in order to acknowledge receipt of said command.

7. The apparatus according to claim 4, wherein said predetermined signal includes an identification of the vehicle.

* * * * *